(12) United States Patent
Douglas et al.

(10) Patent No.: US 10,224,868 B2
(45) Date of Patent: Mar. 5, 2019

(54) SOLAR FOCUSING DEVICE AND METHOD OF USING THE DEVICE

(71) Applicants: Robert Douglas, Winter Park, FL (US); David Douglas, Winter Park, FL (US)

(72) Inventors: Robert Douglas, Winter Park, FL (US); David Douglas, Winter Park, FL (US)

(*) Notice: Subject to any disclaimer, the term of this patent is extended or adjusted under 35 U.S.C. 154(b) by 83 days.

(21) Appl. No.: 15/196,588

(22) Filed: Jun. 29, 2016

(65) Prior Publication Data

US 2018/0006600 A1    Jan. 4, 2018

(51) Int. Cl.
*G02B 19/00* (2006.01)
*H02S 20/32* (2014.01)
*H02S 40/22* (2014.01)
*H02S 20/30* (2014.01)
*G01S 19/02* (2010.01)
*G02B 3/00* (2006.01)
*H02J 3/38* (2006.01)

(52) U.S. Cl.
CPC .............. *H02S 40/22* (2014.12); *G01S 19/02* (2013.01); *G02B 3/00* (2013.01); *G02B 19/0014* (2013.01); *G02B 19/0028* (2013.01); *G02B 19/0042* (2013.01); *H02S 20/30* (2014.12); *H02S 20/32* (2014.12); *H02J 3/383* (2013.01)

(58) Field of Classification Search
CPC ............ G02B 19/0014; G02B 19/0028; G02B 19/0042; H02J 3/383; H02S 20/30; H02S 20/32; H02S 40/22
See application file for complete search history.

(56) References Cited

U.S. PATENT DOCUMENTS

| | | | | |
|---|---|---|---|---|
| 3,781,647 | A * | 12/1973 | Glaser | B64G 1/428 322/2 R |
| 4,305,555 | A * | 12/1981 | Davis | B64G 1/428 136/292 |
| 7,612,284 | B2 * | 11/2009 | Rogers | B64G 1/428 136/246 |
| 2003/0006345 | A1 * | 1/2003 | Guo | B64G 1/361 244/168 |
| 2006/0016934 | A1 * | 1/2006 | Sharer | B64G 1/1085 244/158.4 |
| 2010/0263709 | A1 * | 10/2010 | Norman | F24J 2/07 136/246 |
| 2010/0276547 | A1 * | 11/2010 | Rubenchik | B64G 1/222 244/172.8 |
| 2016/0377700 | A1 * | 12/2016 | Englert | G01S 5/10 342/357.78 |
| 2016/0380486 | A1 * | 12/2016 | Hajimiri | B64G 1/44 307/104 |
| 2017/0138636 | A1 * | 5/2017 | Grill | F24J 2/067 |

* cited by examiner

*Primary Examiner* — Levi Gannon
(74) *Attorney, Agent, or Firm* — Anderson Gorecki LLP

(57) ABSTRACT

A computer-implemented method and solar focusing apparatus is presented. A spacecraft system is placed in orbit around a sun, the spacecraft system including a lens element focusing divergent energy received from said sun into generally parallel energy. A ground receive element on earth receives the generally parallel energy from the spacecraft system. A control element is provided and is in communication with the spacecraft system and the ground receive element.

22 Claims, 19 Drawing Sheets

SOLAR FOCUSING DEVICE AND METHOD OF USING THE DEVICE

BACKGROUND

The sun is approximately 1,400,000 km in diameter and emits electromagnetic energy as well as charged particles. The decline in the solar flux is related to the inverse of the square of the distance from the surface of the sun. For example, the doubling the distance from the sun will reduce the solar flux by 75%. The earth is located approximately 150,000,000 km away and experiences a solar flux of 1.37 kW/m$^2$. The decline in solar flux at the altitude of the earth's orbit is a limiting factor for optimizing utilization of the sun's energy. At an altitude of 1,500,000 km from the sun, the solar flux is estimated to be 10,000 times as much or equal to approximately 1.37 GW/m$^2$.

Despite the lower solar flux at the earth's distance of 150,000,000 km from the sun, solar panels on earth are commonly used to harness this solar energy. There has been a great effort in recent years to move toward renewable energy as to ensure the sustainability of the earth. solar energy is a form of renewable energy, provides an alternative to fossil fuels and potential for clean energy for generations to come. The major limiting factor is the solar flux at far distances from the sun.

SUMMARY

The presently described solar focusing device and method of using the device provides a method and apparatus for concentrating the solar photon energy into a parallel or near-parallel beam so that its solar flux remains nearly constant over the distance traveled. This device includes a satellite in Low Solar Orbit (LSO), which this patent defines as less than 1 Astronomical Unit (AU), equipped with a focusing device to convert diverging light from the sun into parallel light, which will be termed the "solar lens satellite." The key benefit of this arrangement is that high solar flux can be maintained over long distances.

The system involves placement of a satellite equipped with a focusing device in near solar orbit where solar flux is high, converting the diverging light from the sun into parallel light such that the high solar flux energy can be utilized at the target. The key benefit is the increase in electrical power from solar energy (W m$^2$), which would provide clean, renewable energy and reduce reliance on fossil fuels.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
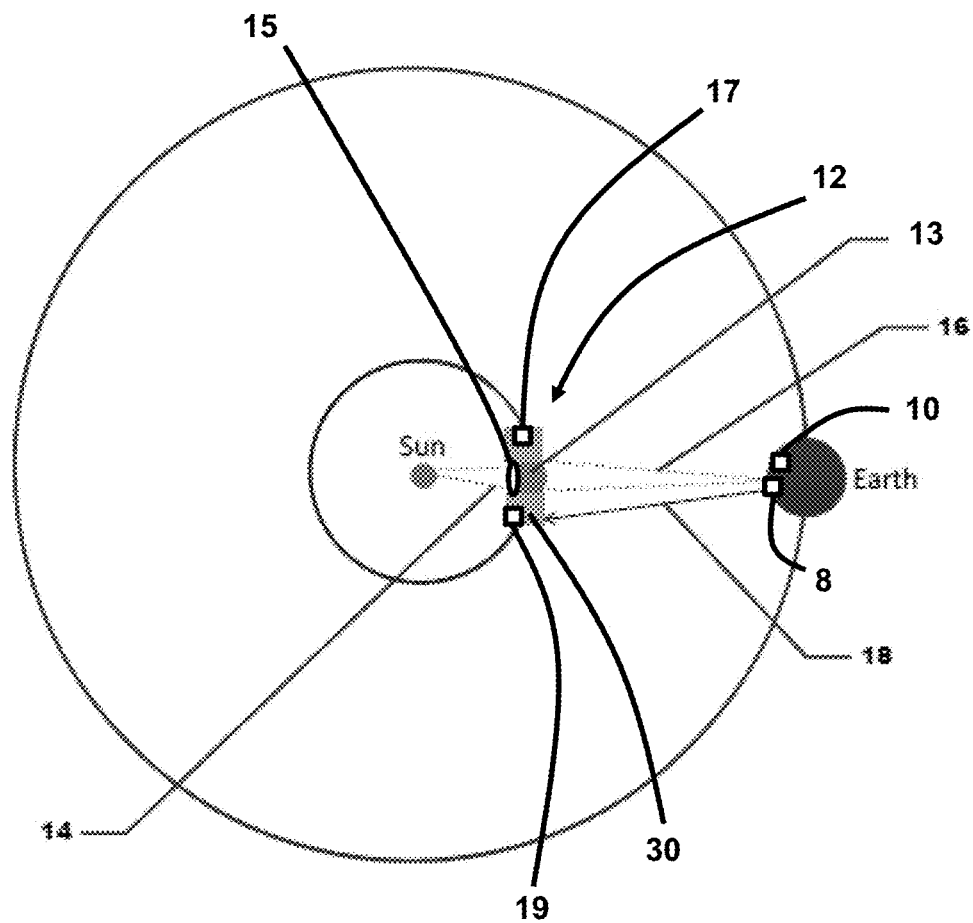
FIG. 1 is a diagram showing the sun, the solar lens, and the earth lined up in a linear fashion.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Figure 2:
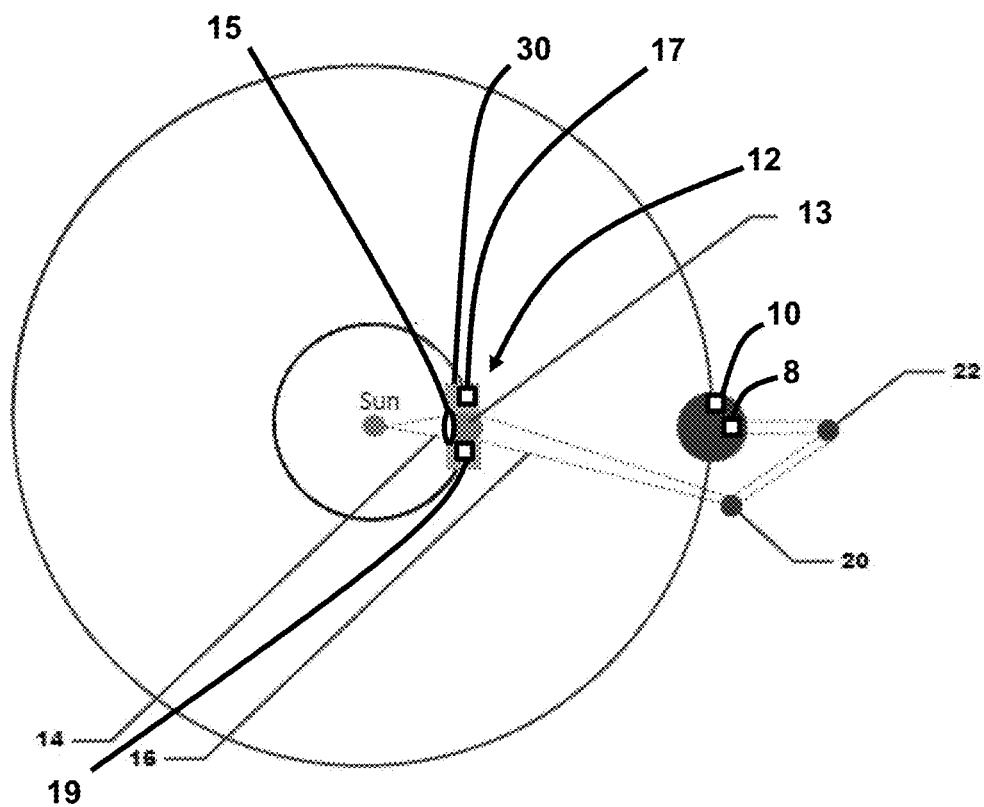
FIG. 2 is a diagram showing the sun, the solar lens, and a pair of relay satellites.

Referring to FIGS. 1 and 2, key systems envisioned within the process and the sub-elements within these systems are described below. The key elements include a solar lens 12, a relay system 20, 22, a ground receive element 8, and a system control element 10.

The solar lens 12 (also referred to herein as the Spacecraft System) is composed of several sub-elements. One sub-element is the lens sub-element 13. The lens sub-element takes the diverging energy emitted from the sun in the direction of the spacecraft and focuses it into an energy beam of near parallel light. This function is performed by lens(es) which on the sun side are focused at the visible surface of the sun from the Spacecraft System perspective and, in turn, refocus the energy such that it is pointed toward the final target the ground receive element or the Relay System, described below.

Another sub-element of the spacecraft system is the shutter sub-element 15. The shutter's function serves to prevent light from hitting the lens. The solar lens satellite and/or relay satellites must receive constant laser signal by ground based system in order to keep shutter open. If the solar lens satellite tilts off axis, the laser will no longer activate the satellite(s) and the shutter will be signaled to close immediately. Ground control direction control will be delayed given the time lag (e.g., several minutes) for the long distance that the light must travel from earth to the LSO. Therefore, the primary alignment assurance process" must be located on the solar lens or relay satellite(s).

The spacecraft system also includes a solar sail sub-element 30. The solar sail sub-element collects solar wind emitted from the sun in order to create a force, which opposes to the gravitational pull on the Spacecraft System. Increasing/decreasing the presented area of the solar sail can increase or decrease the amount of force exerted. Changing the direction of the sail can alter the direction of the force in accordance with the law of conservation of momentum. Multiple ways are possible to increase or decrease the presented area of the solar sail. One design would be to rotate the sails along an axis such as the roll axis. One type is intelligent actuators attached to a rigid framework holding the solar sails. Another method would be to have elements that provide thrust at key positions on the framework holding the solar sails. A further possibility would operate the sail in a manner similar to raising or lowering sails on a sailboat.

The spacecraft system further includes a control sub-element 17. The control sub-element has multiple functions: receive, respond to commands from the System Control Element, and report status to the System Control Element, described below; monitor the pointing vector of the energy beam emanating from the lens sub-element to ensure the accurate pointing of the energy beam and adjust, as necessary; monitor any changes to the orbit of the Spacecraft System and adjust, as necessary to presented area of the solar sail sub-element; monitor and report the health of the Spacecraft System to the System Control Element.

The spacecraft system additionally includes a communication sub-element 19 and a power sub-element. The communication sub-element receives and transmits to both the System Control Element and the Relay Element. The Power sub-element preferably collects energy emitted from the sun, converts it into usable power and supplies power to meet the need of the above sub-elements.

The Relay System 20, 22 is a system that intercepts the energy beam emanating from the Spacecraft System (aka "solar lens") and focuses it onto either additional relays or onto the Ground Receive Element, described below. Multiple Relay System satellites can be used (e.g. one relay satellite for every 10 million km of travel) if needed. The final Relay System satellite would be in close proximity to the earth. This could be in a fixed stationary position (e.g. above North Pole) or in orbit. Possible orbits include geosynchronous orbit, but makes minor adjustments to ensure intercept of the energy beam emanating from the Spacecraft Element (aka "solar lens").

The Relay System includes a refocusing sub-element. The refocusing sub-element takes the energy beam emanating from the Spacecraft Element and re-focuses it the energy beam such that it is pointed toward either the next Relay system or the Ground Receive Element, described below.

The Relay System also includes a control sub-element. The control sub-element has multiple functions: receive and respond to commands by the System Control Element, and report status to the System Control Element, which is described below; monitor the pointing vector of the energy beam emanating from the lens sub-element to ensure the accurate pointing of the energy beam to the Ground Receive Element and adjust as necessary; monitor the location of the center of the energy beam emanating from the Spacecraft System and make any changes to the orbit of the Relay System as necessary to ensure the maximum energy is received; monitor and report the health of the Relay System to the System Control Element.

The Relay System additionally includes a Communication sub-element and a power sub-element. The Communication sub-element receives and transmits to both the System Control Element and the Spacecraft System. The Power sub-element preferably collects energy emitted from the sun, converts it into usable power and supplies power to meet the need of the above sub-elements.

The Ground Receive Element 8 is located on earth and receives the energy beam from the Relay Element and converts it into usable electricity. This would include technologies commonly referred to as Concentrated Solar Power (CSP). The CSP receive sub-element would be positioned on the ground and be directly impacted by the energy beam. The large solar flux can be utilized for power in multiple ways. For example, the energy beam would heat molten salt and which would subsequently be moved to storage tanks. Then, based on electricity demand at the time, transported, for example, to steam generators and use a process such as the "Rankine Process" to create the electricity.

The Ground Receive Element includes a receive sub-element. The receive sub-element would be sized in accordance with the diameter of the energy beam (e.g., if the diameter of the lens sub-element of the Spacecraft System were 60 meters, then the diameter of the Receive sub-element would be 60 meters plus some margin). Alternatively, the diameter could be increased to allow lower total flus on the receive components. The final relay would increase the beam spread accordingly. The energy beam from the Relay Element would be centered on the Receive sub-element. This received energy would raise the temperature of a material such as molten salt to desired temperatures (e.g., 1,000° C.). A plumbing network would transport the molten salt to and from storage tanks and Electrical Generator sub-element, described below.

The Ground Receive Element also includes a storage sub-element. The Storage sub-element would employ technologies such as thermos containment for high efficiency storage of the molten salt.

The Ground Receive Element further includes an Electrical Generator sub-element. There are a number of options for conversion of the molten salt to energy. For example, the molten salt could be transported from the Storage sub-element to steam generators via the plumbing network and use a process such as the "Rankine Process" to create the electricity. This sub-element would also include the cables and high voltage transformers to interface with the national grid.

The Ground Receive Element additionally includes a Control sub-element 10. The Control sub-element would provide the following: sensors to track the accuracy of the energy beam with respect to centering on the Receive sub-element and report to the System Control Element; receive information from the System Control Element concerning the electrical demand throughout the day and adjust, as necessary, the flow of the molten salt through the Ground Receive sub-elements to meet the demand; monitor and report the health of the Ground Receive Element to the System Control Element. Interfaces with the "Alignment Assurance Process" on the solar lens satellite.

The Ground Receive Element includes a communication sub-element and a power sub-element. The Communication sub-element receives and transmits to the System Control Element. The Power sub-element supplies power to meet the need of the above sub-elements.

The System Control Element monitors and controls the entire system. It also provides the interface with control elements of the national electrical grid. Key functions include: monitoring the orbits of the Spacecraft System and Relay Element and issuing commands to maximize the efficiency of the system; monitoring electrical demand as indicated by the national grid control elements and direct the Ground Receive Element accordingly; and ensures system safety. Key sub-elements are as follows:

The System Control Element includes a System Control Center. The System Control Center monitors the health, efficiency and safety of the entire system. It provides the computers, algorithms, displays, interfaces with the Communications sub-system and nation grid control elements and human interfaces to operate the system. It receives and reacts to information received from the Spacecraft System; Relay Element and Ground Receive Element.

The System Control Element also includes a Communications Network. The Communications Network passes data and control commands throughout the system and all elements therein. It also provides the link to the national grid control elements.

One key element is the locations of Ground Receive Elements. One possible implementation would be to have a Ground Receive Element on each of the heavily populated continents. It is envisioned that site election for the Ground Receive Elements would be located in arid areas with close access to road and power networks. Rationale is that arid regions typically have a very high fraction of cloud free days. Proximity to both a road network and power grid minimizes infrastructure costs. An example would be the US Southwest away from populates area yet in proximity of an Interstate highway and major power lines. Other examples in other territories of the world would include: North Pole, South Pole, Atacama; Sinai; Gobi, etc. If the Ground Receive Element is located near the poles, then new power lines would need to be created. The advantage of the Poles would be that from the sun's perspective they are fixed targets. A natural or man-made large tower at the North Pole could be constructed to capture the high solar flux energy.

Achieving an earth synchronous orbit in close proximity to the sun, such that the sun, the solar lens satellite, and possibly additional Relay System Satellites and the Ground Receive Element will be optimally configured (FIGS. 1-2).

Very little is known about the environment at approximately 150,000 km from the sun. Whereas the energy deposited from the sun in W/m² is relatively constant at the earth, it could fluctuate by an order of magnitude or more at the specific location of the Spacecraft System. Also, the force exerted on the solar sail could experience rapid changes of unknown magnitude. These changes tend to dampen out when integrated over the visible surface of the sun, as measured at earth's 1 AU distance. Prior to finalizing the Spacecraft System design, an important step would be to send a Measurement System into the selected orbit to collect data. In addition to energy and force data, temperature recordings for differing reflectivity; robustness of different materials, electronics, and structural components; and effectivity of different types of lasers need to be collected and analyzed.

While the objective system envisions Spacecraft System in close proximity to the sun, it might be desirable to start at a distance of, for example, ½ the distance to the sun. At this distance the energy beam emanating from the lens sub-element, would be four times that currently arriving from the sun. Aiming errors tolerances are less stringent; thermal environment is less challenging; and communications times are less at this distance. Capabilities of Ground Receive Element could grow incrementally, but would have an important increase in power generated. After the system was operational for a period of time and design improvements were studied, the next step could be to move to an orbit ¼ the distance to the sun of the earth orbit. At this distance, a gain of 16 in energy could be realized.

In regards to the temperature, the system as a whole must be able to withstand high temperatures if placed in LSO. The first step is to understand the design implementations for the temperature at the Spacecraft System.

Using the following formula, the temperature equivalent (Te) can be calculated, $$T_e = \sqrt[4]{\frac{S}{4\sigma} \times (1-A)},$$

where S is the energy received at the orbital distance from the sun and (1−A) is a measure of system reflectivity. Given very low reflectivity the approximate expected temperature of the Spacecraft Element at an orbit 1,500,000 km from the sun is approximately 2687° K, a reflective surface could reduce this by a substantial factor. This high temperature presents design challenges. Examples of methods to deal with high temperatures include, but are not limited to the following examples: electronics could be packaged in a high reflectivity box; tungsten could be the framework; optical elements could be of ceramic type material, etc.

Wein's displacement law states that the spectral radiance of black body radiation per wavelength peaks at a wavelength given by the equation, $$\lambda_{max} = \frac{b}{T},$$

where b equals 2897 μm° K and T is the temperature in ° K. Assuming b of 1896 μm° K and T of 2687° K (with low reflectivity) would yield a peak intensity of approximately 1.07 μm. Therefore, no special materials are needed to ensure proper transmissions is the case for infrared energy.

The solar sail must have several unique properties in order to meet the requirements of such a mission into LSO. The solar sail must have a large surface area, reflective surface to generate force and durability against temperature, micrometeriods and charged particles. Typical materials for the solar sail include thin metal-coated (e.g. aluminum) durable plastics such as Mylar or Kapton. The design of the sail used could be in the form of a square sail with boom support, a heliogyro sail for rotating blades or a circular disc sail. The direction of the force exerted is related to the direction of the sail in relation to the sun. Conservation of momentum dictates the amount of momentum deposited from the photons impacting and reflecting off of the solar sail with the reflected photons losing energy in the form of transitioning into longer wavelengths. The incoming photon energy is defined by Einstein's equation, $$\rho = \frac{E}{c},$$

where $\rho$ represents momentum with units of $$kg \times \frac{m}{s},$$

E represents Energy with units of Joules, Newton meters or $$kg \times \frac{m^2}{s^2}$$

and c represents the speed of light or $3.0 \times 10^8$ m/s.

Figure 3:
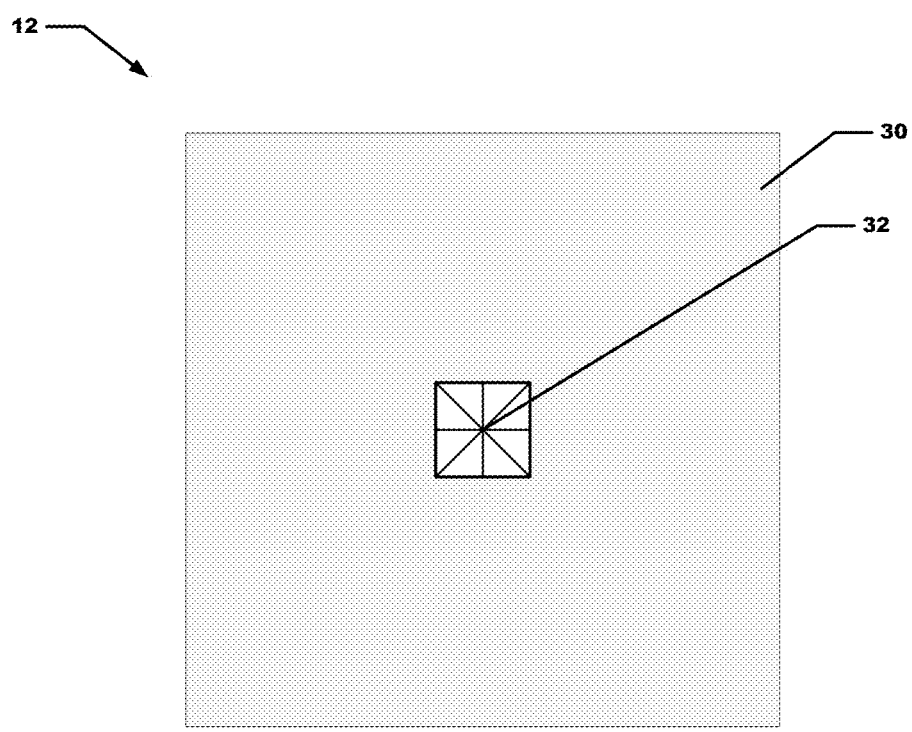
FIG. 3 is a diagram of a solar sail having a focusing lens.
Figure 5:
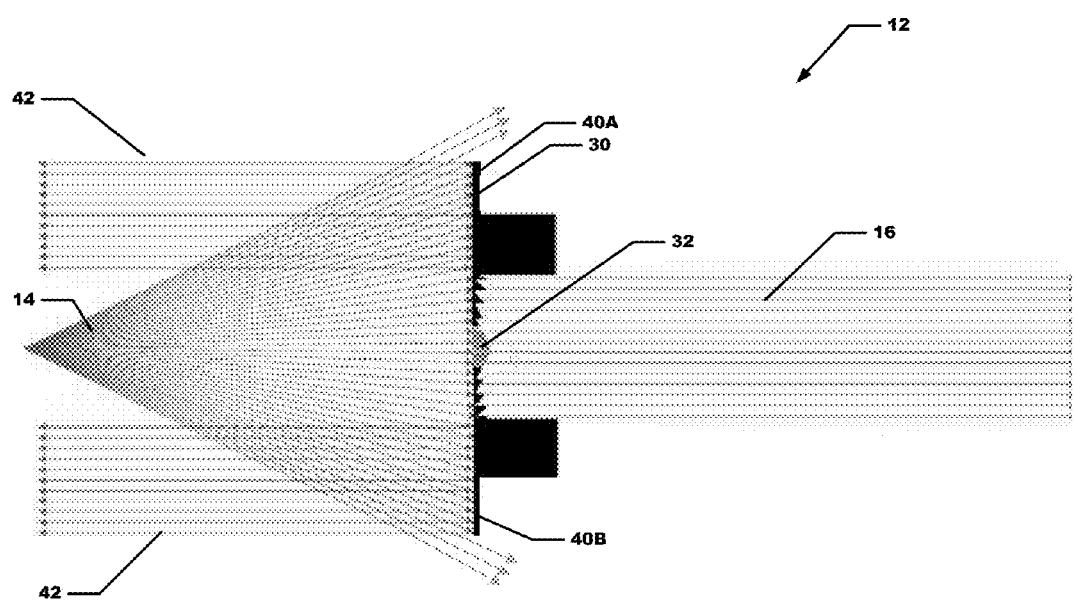
FIG. 5 is a schematic diagram of the solar lens satellite with flaps open.
Figure 6:
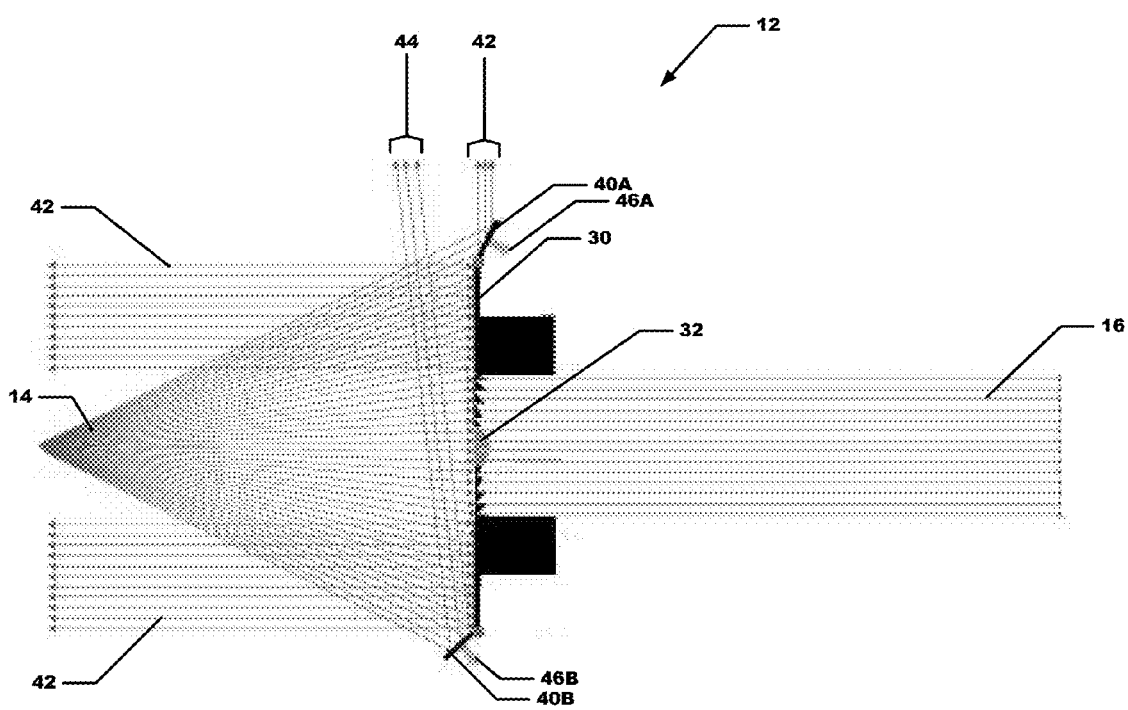
FIG. 6 is a schematic diagram of the solar lens satellite with flaps angled.
Figure 7:
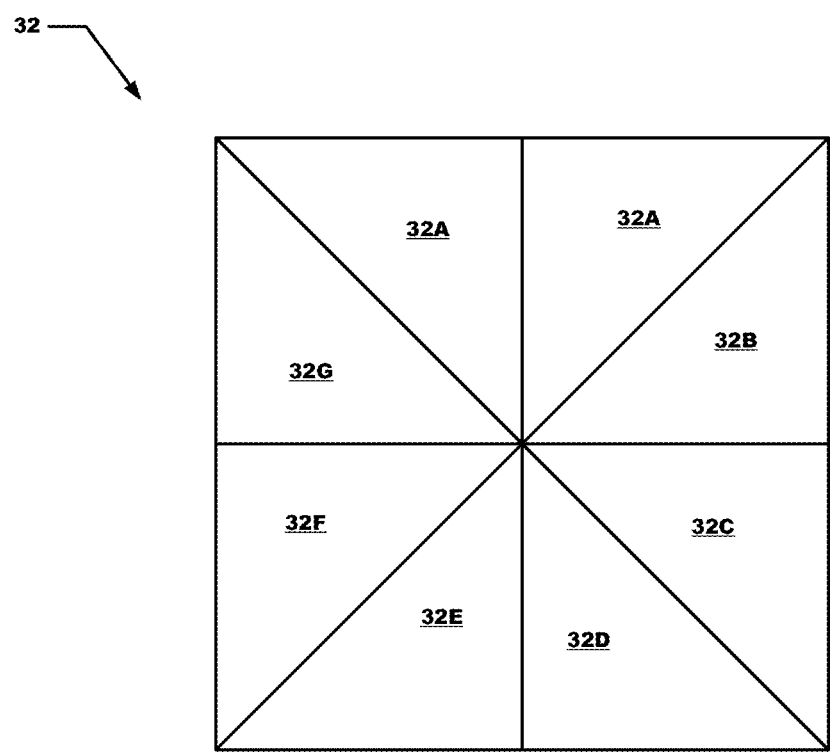
FIG. 7 shows the solar sail broken down into similar triangles.

The solar sails and relay satellite sails in this mission must also have the ability to change size and angle to maintain the precise orbit needed to fulfill the mission. The force on the satellite can be calculated by the change in momentum, or $$F = \frac{\partial \rho}{\partial t} = m \frac{\partial v}{\partial t} = m \times a,$$

where F is the force, $\rho$ is the momentum, $$\frac{\partial \rho}{\partial t}$$

is the change in momentum with respect to time, m is the mass of the satellite, $$\frac{\partial v}{\partial t}$$

is the change in velocity over time and a is the acceleration. If the surface area of the sail needs to be decreased, then the periphery can be opened allowing the light to pass through (FIG. 5). If the surface area of the sail needs to be increased, then the periphery can be closed (FIG. 3). Furthermore, the direction of the flaps could be changed allowing so that the direction of the solar sail can be altered (FIG. 6). Because the designed lens must be large enough to focus a large amount of light, the lens could be assembled in parts. As an example, a 30-meter square Fresnel lens could be made of 8 different smaller triangles with dimensions of approximately 15×21 meters per triangle (FIG. 7).

Also, the effective area of the solar sails for collecting solar wind could be changed as the sun goes through its natural 11-year cycle. These methods are equally applicable to other naturally occurring phenomena such a coronal mass ejections and fluctuations in gravitational pull on the spacecraft system. For example, the frame containing the solar sail could be rotated such that the presented area of the sail as viewed from the direction of the approaching solar winds is varied and adjusted to be in consonance with the and in the opposite direction of the gravitational pull from the sun. Alternatively, the frame containing the solar sail is extended or contracted such that the presented area of the sail as viewed from the direction of the approaching solar winds is varied and adjusted to be in consonance with the and in the opposite direction of the gravitational pull from the sun. Alternatively, the mast system used to support the solar sail is rotated such that the presented area of the sail as viewed from the direction of the approaching solar winds is varied and adjusted to be in consonance with the and in the opposite direction of the gravitational pull from the sun. Alternatively, the mast system used to support the solar sail is extended or contracted such that the presented area of the sail as viewed from the direction of the approaching solar winds is varied and adjusted to be in consonance with the and in the opposite direction of the gravitational pull from the sun.

The lens sub-element on the Spacecraft System is key to achieving the very high energy density that would be delivered to earth. This process covers, but is not limited to the following types of lens. Using a distance of $1.5*10^6$ km from sun and sun radius (in km) of $6.95*10^5$ whose arc tangent=24.8 degrees. So, from the lens perspective the cone from which it could collect energy would have an interior angle of about 49.6 degrees. So if the lens were properly designed, could we get a factor of 50. For an estimate of the total energy that could be delivered for a 30 meter radius lens would equal $2.826*10^3$ (i.e., area of lens)*$5.0*10^1$ (i.e., lens efficiency)*$1.1839*10^7$ (i.e., energy at $\frac{1}{93}$ AU)=$1.67*10^12$- or 1.67 TW. A Fresnel Lens is a logical candidate in that the mass of the lens is minimal and the gain is achieved through concentric circular notches, the angle of which changes as the circles progress from the outer to inner circles. A variation f the Fresnel Lens would be to rotate it so that the effect of small manufacturing anomalies would have minimal impact on system performance. Another candidate would be a very large of small lens. Other possibilities include larger diameters; a 40 m would almost double the total energy in the beam.

The desired orbit has two key features. First, it would be a low solar orbit (LSO), defined in this patent as less than 1 Astronomical Unit (AU) where the solar lens is exposed to a higher solar flux than the earth. Second, it would maintain an orbital angular velocity equal to the earth. Maintaining an angular velocity equal to the earth would allow maintenance of a linear relationship between the sun, the solar lens satellite and the earth at all times. The orbital angular velocity of the earth around the sun is 360°/year or approximately 1.015°/day.

An orbital altitude of less than 1 AU with an orbital angular velocity of 1.015°/day does not exist naturally because objects closer to the sun need to maintain a higher orbital velocity to maintain altitude. For example, the orbital velocity of a satellite is defined by, v=

$$v = \sqrt{\frac{G \times M}{R}},$$

where v is the velocity, G is the gravitational constant of $$6.67 \times 10^{-11} \frac{\text{N} \cdot \text{m}^2}{\text{kg}^2},$$

M is the mass of the central body around which the satellite orbits and R is the orbital radius or altitude. The mass of the sun is $1.99 \times 10^{30}$ kg. The distance from the earth to the sun is $150 \times 10^9$ m. Thus, the earth's orbital velocity around the sun is approximately $$\sqrt{\frac{6.67 \times 10^{-11} \frac{\text{N} \cdot \text{m}^2}{\text{kg}^2} \times 1.99 \times 10^{30} \text{ kg}}{150 \times 10^9 \text{ m}}} \text{ or } \sim 30 \text{ km}/\textit{sec}.$$

If the distance from the earth to the sun is reduced by half to achieve a solar flux increase by a factor of 4, then the new orbital velocity would change to $$\sqrt{\frac{6.67 \times 10^{-11} \frac{\text{N} \cdot \text{m}^2}{\text{kg}^2} \times 1.99 \times 10^{30} \text{ kg}}{75 \times 10^9 \text{ m}}} \text{ or } \sim 42 \text{ km/s}.$$

Thus, the satellite's natural orbit at a distance closer to the sun is at a greater velocity. Furthermore, the smaller circumference of the orbit would contribute to an even greater angular velocity. The orbital period at the altitude of $75 \times 10^9$ m/s is approximately 2.8° around the sun every 24 hours, which is higher than the orbital angular velocity of the earth around the sun. An energy efficient low solar orbit needs to be established with an angular velocity of 1.015°/24 hours to match the earth, but this does not occur naturally.

Figure 8:
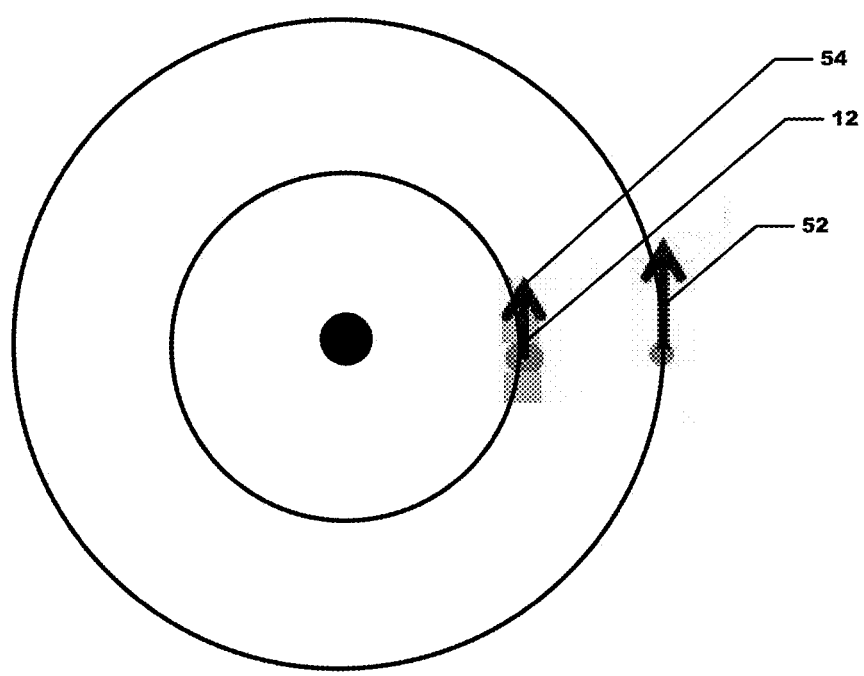
FIG. 8 is a diagram showing the earth's and the solar lens' orbital distance and orbital velocity.
Figure 9:
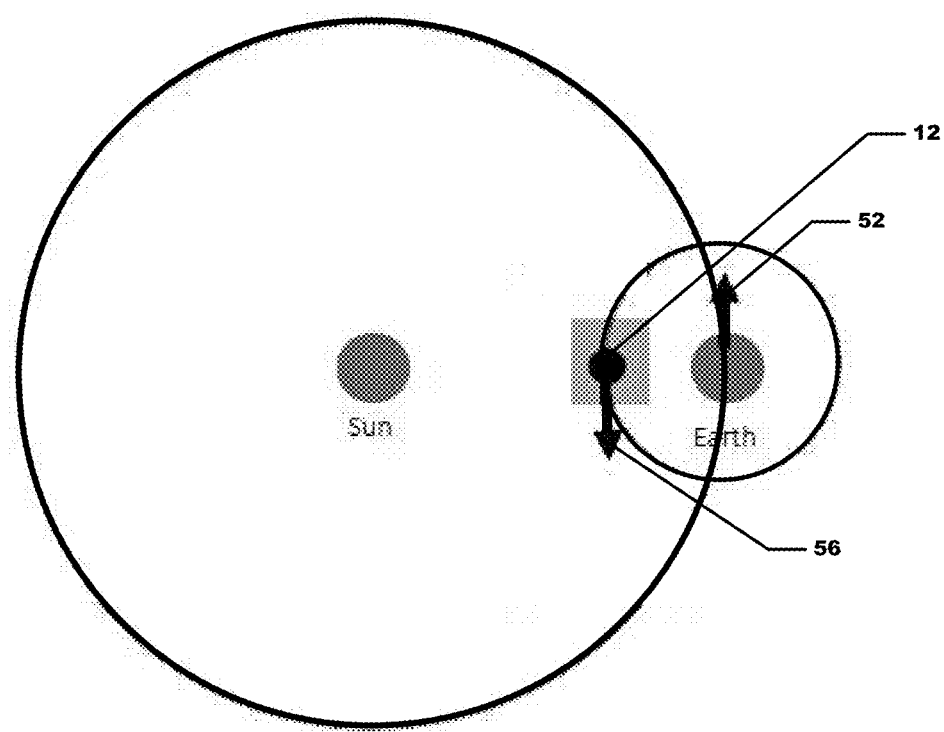
FIG. 9 is a diagram showing an exit trajectory to achieve slow down.

The earth has a distance of $150 \times 10^9$ m from the sun, an angular velocity of 1.015°/day and an orbital velocity is ~30 km/sec. Assuming a desired LSO altitude for the solar lens of $75 \times 10^9$ m, which would increase the solar flux by a factor of 4 and a desired orbital angular velocity of 1.015°/day to match that of the earth, its orbital velocity would need to be ~15 km due to the smaller circumference of the orbit (FIG. 8). In order to get from a starting orbital velocity of ~30 km/s to a finishing velocity of ~15 km/sec, a propulsion of 1 m/s² must be performed for 15,000 seconds. Higher acceleration burns could be performed for shorter time intervals and shorter acceleration burns could be performed for longer time intervals. In order to more efficiently reduce the orbital velocity, the exit trajectory could be opposite of the earth's velocity (FIG. 9). After the burn to slow down the velocity, the gravitational force will pull the solar lens satellite inward toward the sun. Assuming the solar lens satellite is hovering over the sun (i.e. not orbiting), centrifugal force will not be present and the net force on the satellite will be equal to the difference between the gravitational force and the force exerted by the sail (FIG. 10), $F_{Gravity} - F_{Sail} = F_{Satellite}$. The force of Gravity can be defined as $$\frac{G \times m_1 \times m_2}{r^2},$$

where G equals $$6.7 \times 10^{-11} \frac{\text{Nm}^2}{\text{kg}^2},$$

$m_1$ is the mass of one of the objects, $m_2$ is the mass of the other object and r is the distance between the two objects. The force on the satellite exerted by the solar sail can be defined as $$\frac{H_O \times SA_{Sail}}{c},$$

where $H_O$ is the solar radiation intensity at a particular altitude, $SA_{Sail}$ is the surface area of the solar sail and c is the speed of light. The solar radiation intensity at a particular altitude can be defined as $$H_O = \frac{R_{Sun}^2}{D^2} \times H_{Sun}$$

where $R_{Sun}$ represents the radius of the sun, D represents the distance to the surface of the sun and $H_{Sun}$ represents the radiation intensity at the surface of the sun in $$\frac{\text{W}}{\text{m}^2}.$$

Thus, assuming a 100 kg solar lens satellite, a $1.3 \times 10^5$ m² solar sail surface area, the mass of the sun of $2.0 \times 10^{30}$ kg, the radius of the sun of $1.4 \times 10^9$ m, the gravitational constant of $$6.7 \times 10^{-11} \frac{\text{Nm}^2}{\text{kg}^2},$$

the speed of light of $$3.0 \times 10^8 \frac{\text{m}}{\text{s}},$$

the solar radiation intensity at the surface of the sun of $$1.5 \times 10^7 \frac{\text{W}}{\text{m}^2},$$

the force exerted on the Satellite can be defined as, $$\frac{\left(6.7 \times 10^{-11} \frac{\text{Nm}^2}{\text{kg}^2}\right) \times (100 \text{ kg}) \times (2.0 \times 10^{30} \text{ kg})}{r^2} - \frac{\left(\frac{1.4 \times 10^9 \text{ m})^2}{(r - 1.4 \times 10^9 \text{ m})^2}\right) \times \left(1.5 \times 10^7 \frac{\text{W}}{\text{m}^2}\right) \times (1.3 \times 10^5 \text{ m}^2)}{3.0 \times 10^8 \frac{\text{m}}{\text{s}}} = F_{Satellite}$$

where r is equal to the distance from the solar lens satellite and the center of the sun. Given Newton's 2nd equation of F=m×a, where m represents mass and a represents acceleration, the acceleration of the Satellite at a given distance, r, from the center of the sun can be defined by the equation, $$\frac{\left(1.34 \times 10^{22} \frac{\text{kg} \times \text{m}^3}{\text{s}^2} \times \frac{1}{r^2}\right) - 1.27 \times 10^{22} \frac{\text{kg} \times \text{m}^3}{\text{s}^2} \times \frac{1}{(r - 1.4 \times 10^9 \text{ m})^2}}{100 \text{ kg}}.$$

Assuming the satellite is in a fixed position over the sun (i.e. not orbiting the sun), this analysis can be modeled for varying distances from the sun, as seen in Table 1 below and plotted in FIG. 11.

TABLE 1

| Distance from center of sun (in meters) | Altitude from Surface (in meters) | Acceleration of Satellite at Current altitude (in meters/second) |
|---|---|---|
| 1.51E+11 | 1.50E+11 | 0.000204254 |
| 1.41E+11 | 1.40E+11 | 0.000225581 |
| 1.31E+11 | 1.30E+11 | 0.000249691 |
| 1.21E+11 | 1.20E+11 | 0.000276666 |
| 1.11E+11 | 1.10E+11 | 0.000306156 |
| 1.01E+11 | 1.00E+11 | 0.000336791 |
| 9.14E+10 | 9.00E+10 | 0.000364783 |
| 8.14E+10 | 8.00E+10 | 0.000380552 |
| 7.14E+10 | 7.00E+10 | 0.000359884 |
| 6.14E+10 | 6.00E+10 | 0.000238681 |
| 5.14E+10 | 5.00E+10 | −0.000168904 |
| 4.14E+10 | 4.00E+10 | −0.001487188 |
| 3.14E+10 | 3.00E+10 | −0.006375427 |
| 2.14E+10 | 2.00E+10 | −0.032094462 |

Table 1: Estimate of the acceleration of the satellite given solar sail trimmed to 13×10$^5$ m$^2$ and at varying altitudes ranging from Approximately 1 AU (150×10$^9$ m) down to 0.13 AU (20×10$^9$ m). Note that positive numbers given this schematic represent acceleration of the solar lens satellite toward the sun and negative numbers represent acceleration of the solar lens away from the sun. Also note that when the Satellite crosses from 60×10$^9$ m to 50×10$^9$ m its direction of acceleration reverses. This is due to the increase in force from the solar sail overcoming the gravitational force.

Given these estimates and the formula, time=√2×a×d, where a represents acceleration and d represents distance and the fact that the satellite must travel a great distance of millions of kilometers, the total time for positioning of the satellite is estimated to take approximately one year. Ultimately, the force of the solar sail countering the gravitational force will provide the ability to establish an energy efficient orbit LSO orbit.

Alternatively, to meet the goal of $F_{Satellite}=0$ such that it is in a stationary altitude above the sun, the surface area of the sail can be calculated by $$\frac{\left(6.7 \times 10^{-11} \frac{\text{Nm}^2}{\text{kg}^2}\right) \times (m_1) \times (2.0 \times 10^{30} \text{ kg}) \times \left(3.0 \times 10^8 \frac{\text{m}}{\text{s}}\right)}{(r^2) \times \left(\frac{1.4 \times 10^9 \text{ m})^2}{(r - 1.4 \times 10^9 \text{ m})^2}\right) \times \left(1.5 \times 10^7 \frac{\text{W}}{\text{m}^2}\right)} = SA_{Sail},$$

where $m_1$ is the mass of the satellite. If the satellite has a mass of 100 kg, then $$\frac{\left(6.7 \times 10^{-11} \frac{\text{Nm}^2}{\text{kg}^2}\right) \times (100 \text{ kg}) \times (2.0 \times 10^{30} \text{ kg}) \times \left(3.0 \times 10^8 \frac{\text{m}}{\text{s}}\right)}{(r^2) \times \left(\frac{1.4 \times 10^9 \text{ m})^2}{(r - 1.4 \times 10^9 \text{ m})^2}\right) \times \left(1.5 \times 10^7 \frac{\text{W}}{\text{m}^2}\right)} = SA_{Sail}.$$

Applying this formula at multiple altitudes, the required $SA_{Sail}$ can be calculated for a satellite of 100 kg (Table 2).

TABLE 2

| Distance from center of sun | Altitude from the surface of the sun | Required sail size for the net force on the satellite to be equal to zero |
|---|---|---|
| 1.51E+11 | 1.50E+11 | 134217.61 |
| 1.41E+11 | 1.40E+11 | 134040.48 |
| 1.31E+11 | 1.30E+11 | 133836.54 |
| 1.21E+11 | 1.20E+11 | 133599.19 |
| 1.11E+11 | 1.10E+11 | 133319.51 |
| 1.01E+11 | 1.00E+11 | 132985.05 |
| 9.14E+10 | 9.00E+10 | 132577.97 |
| 8.14E+10 | 8.00E+10 | 132071.74 |
| 7.14E+10 | 7.00E+10 | 131425.12 |
| 6.14E+10 | 6.00E+10 | 130570.32 |
| 5.14E+10 | 5.00E+10 | 129387.55 |
| 4.14E+10 | 4.00E+10 | 127643.30 |
| 3.14E+10 | 3.00E+10 | 124813.61 |
| 2.14E+10 | 2.00E+10 | 119429.38 |

Table 2: Assuming the mass of the satellite is 100 kg, then the required sail size to maintain the net force on the satellite to be equal to zero is displayed in the column on the right.

If the satellite is orbiting the sun, then in order to maintain a fixed altitude of orbit, the gravitational force would be equal to the sum of the repelling forces of the solar sail and the centrifugal force.

In order to create a device to focus solar photons on earth, it is imperative that the solar lens orbit the sun at the same angular velocity and the same as the earth. This will allow the sun, the solar lens and the earth to always maintain a linear spatial relationship with one another.

In accordance with the equation, $$v = \sqrt{\frac{G \times M}{R}},$$

the lower orbital radius will require a higher orbital velocity to maintain orbit (e.g. ~42 km/s at 75×10$^9$ km) because the velocity at the denominator is smaller. Yet, the desired orbital velocity is slow (i.e., ~15 km/s at 75×10$^9$ m/s) to match the orbital angular velocity of 1.015°/day.

Thus, we provide a method to create lower solar altitude orbits is through the balancing the force of the solar wind on the solar sail with the gravitational force toward the sun. Thus, employing a solar sail can achieve orbital velocities less than the velocity defined in the equation above in a "fuel free" manner. (FIG. 9)

The gravitational force can be explained by the equation, $$F = G \frac{m_1 \times m_2}{r^2},$$

where G equals $$6.7 \times 10^{-11} \frac{N \times m^2}{kg^2}.$$

Thus, assuming the solar lens has a mass of 100 kg and an altitude of 75×10⁹ m, the gravitational force would equal $$6.7 \times 10^{-11} \frac{N \times m^2}{kg^2} \times \frac{100 \text{ kg} \times 1.99 \times 10^{30} \text{ kg}}{(75 \times 10^9 \text{ m})^2}$$

or ~2.4 N of force. Thus, the solar sail will need to be trimmed to provide the ~2.4 N of force in the opposite direction of gravity.

Given these assumptions of an altitude of 75×10⁹ m, the solar flux will be approximately 4 times that at the distance of 150×10⁹ m in accordance with the inverse square law. At earth, the power is ~1.4 kW/m². Thus, the solar flux at a distance of 75×10⁹ m will be equal to ~5.6 kW/m².

Given Newton's second equation, force equals mass times acceleration, and power equals force times distance divided by time, a Watt is equal to a kg×m²/s³. Dividing the power by the speed of light, $$\frac{5.6 \times 10^3 \text{ kg} \frac{m^2}{s^3}}{3.0 \times 10^8 \frac{m}{s}} \times \frac{1}{m^2},$$

would equal 0.0000186 N/m² at the distance of 75×10⁹ m. Thus, to determine the appropriate amount of solar sail, the size would be equal to $$\frac{2.4 \text{ N}}{0.0000186 \frac{N}{m^2}}$$

size would need to be per 129,000 m². This would be equal to approximately equal to a 360 meter by 360-meter solar sail.

In summary, a solar sail would exert force in a radial direction away from the sun. Gravity would exert force in a radial direction toward the sun. The amount of force exerted by gravity would equal approximately 2.4N assuming 100 kg solar lens satellite at 75,000,000 km from the sun. In order to counter this force of 2.4N, the solar sail system would need to open its sails to approximately 360 m by 360 m. This would result in a static set of forces with no resulting acceleration. The orbital velocity of 15 km/s would also have a centrifugal force, which would lessen the force required by the solar sail. Ultimately, an angular velocity of 1.015°/day to match the earth could be achieved through a powerless system.

A method similar to the solar lens satellite will be performed to achieve the desired orbit of the relay satellites. A variety of orbits could be used for the final relay satellites. For example, the initial solar lens satellite at 1,500,000 miles from the sun can direct the to the first Relay satellite at 10,000,000 miles from the sun, the second Relay Satellite at 20,000,000 miles from the sun and so on. In regards to the final relay satellite, a standard geosynchronous orbit could be used. This would require precise aiming system be used because from the perspective of the sun, a geosynchronous satellite would be a moving target. Alternatively, the use of solar sail could be performed on the final relay satellite to create a fixed position above the earth from the earth's perspective, such as the North Pole. For example, if the final Ground Receive Element was chosen to be located at one of the North's Pole and the final Relay Satellite was located at a fixed position above the earth (FIG. 12-13), then from the perspective of the sun the final relay satellite would be a stationary target. This would increase the chances of successfully reaching the target.

This apparatus could have multiple configurations, which include, but are not limited to refocusing mirrors and/or lenses. For example, very subtle inaccuracies in the aim of the solar lens satellite could result in a miss of the final target. For this reason, relay satellites could be in position. (FIG. 14)

System alignment relies on establishing a Planetary Surveillance System (PSS) which is described in U.S. patent application Ser. No. _____. PSS will provide a very precise location of Spacecraft, Relay and Ground Receive Elements at a precise moment in time. PSS will also provide orientation data to include roll, pitch and yaw for PSS equipped elements. An example System Alignment process follows. For reference, the alignment requires an accuracy of ~1/1,000 of a degree from a distance of 92,000,000 miles (sun at 93,000,000 miles and Spacecraft at 1,000,000 orbit from the sun toward and synchronous with earth's orbit). The first problem is to get the attitude and heading of the lens sub-element to within a specified tolerance. This is analogous to roll, pitch and yaw of a missile with respect to its intended path, but in this case the Spacecraft orbit. A key component of the Control sub-element of the Spacecraft is the attitude and heading system (AHS). An example AHS would consist of actuators and retractable rods to move the corners of the frame holding the lens sub-element. Mass of the lens sub-element would be a factor and thrusters may be utilized. Given the lens sub-element is now within pointing tolerance, the next step is to fine tune the aim point of the lens sub-element. A laser in the Control sub-element would be used in this step. Laser energy travelling at the speed of light takes ~8 minutes 14 seconds from the Spacecraft to earth. Therefore, lasers could be sent bi-directionally. During the intervening time between laser emitting light and its arrival at Relay or Ground Receive Elements, their respective PSS locations will have changed. So in preparation for the alignment process, a lead angle of approximately 2.055 degrees for the alignment is needed. Laser sensors would be placed on the terrain surrounding Ground Receive Element. If no sensor is activated, the beam divergence of the laser could be adjusted. Fine tuning of the pointing could be accomplished by the AHS. Given the fine tuning is accomplished, the next step is to align the energy beam with the Relay Element. This also would be accomplished with the knowledge of the Relay Element PSS location and the AHS. Additional methods include, but are not limited to: stabilizing techniques of the solar lens; relay stations; larger Ground Receive sub-element; etc. Stabilizing techniques to prevent wobble/precession include, but are not limited to: equipped with gyroscopes; spinning lens sub-element to achieve high angular momentum and stability (e.g., angular momentum for a hoop ($L_{axis}=MR^2\omega$) where $L_{axis}$ represents the angular momentum, R represents the radius and ω represents the angular velocity).

With respect to the earth based or space based target for the high solar flux energy, multiple design implementation could be performed. If the target is a power station on the earth, methods to capture the solar energy include, but are not limited to solar panels, water heating methods for steam generation devices, etc. As an example of the amount of energy that can be harvested, consider the assumptions that the "solar lens" placed in orbit at 1,500,000 km from the sun and with an orbital period of equal to one year to match that of the earth. The solar flux at a closer distance from the earth can be calculated by the following formula, $E=W/m^2_{earth}*(1\ AU/R)^2$, where E=energy received at an orbit at distance R from the sun expressed in AU units (Notes: 1 astronomical unit (AU) is equal to the distance from the earth to the sun of approximately 93 million miles; for reference $W/m^2_{earth}$ is 1370 $W/m^2$). This yields a 13.7 $MW/m^2$ for an orbit of 1,500,000 km from the sun, yet a system of lenses could significantly increase the magnitude due to the apparent large field of view subtended by the sun. To put the energy flow into perspective, an average lightning bolt has about 10 billion Watts. During system operation, the energy equivalent would be 100 lightning bolts continuously over a 30 meter diameter circle. This area is roughly 10 times the surface area where parabolic reflectors point to of the solar Energy Generating System (SEGS) in California. Based on lessons learned in constructing SEGS, it may be practical to scale the diameter of the Ground Receive sub-element to be roughly be equivalent SEGS. If this were the case the energy beam emanating from the lens sub-element of the Relay Element could be adjusted from near parallel to slightly diverging to match the desired spot size on the ground.

While the overall benefits of this patent's clean, renewable energy are tremendous, this patent also presents a method and apparatus to overcome the effects of increased solar flux. The spectral signature of earth features varies. For a given material, the percentage absorbed verses reflected will vary for with respect to the wavelength of incident light. For example, in the visible spectrum from approximately 400 to 700 nm, the percentage reflectance for water and soil range between 5 to 10%. In contrast, over the same wavelengths in the visible spectrum, the percentage of reflectance for clouds, snow and ice range up to nearly 70%. The earth can emit absorbed energy in the infrared spectrum, but this emitted energy can be trapped by the greenhouse effect. In contrast, the reflected energy on the visible spectrum can pass through the earth's atmosphere and exit into space. Given the fact that the solar lens increases the amount of solar flux incident on the earth at a particular spot, this patent provides a method and apparatus for achieving a balance in the total energy deposited on the earth. The method includes the replacement of lower reflectance materials with higher reflectance materials, especially in regions of the earth that are exposed to a higher solar flux. For example, this could be done with natural sources (e.g., vegetation) or man-made sources (e.g., aluminum). If a small portion of the desert with reflectance ranging from 5 to 10% were covered with aluminum reflectance material with reflectance of approximately 90%, this could reduce the amount of absorbed solar flux in one territory to counter the additional solar flux in another site. This could be performed at the same ground station or a second ground station (FIG. 16). An alternative benefit of adding a second ground station with higher reflectance would be to combat man-made effects on the planet, such as greenhouse gases or other types of pollution.

Pointing of the flow of energy from the Spacecraft System to the Relay System will change over time based on where the Relay System moving along its geo-synchronous orbit. From the Spacecraft System lens sub-element, this will necessitate an angular change of 0.01649 degrees from the maximum lead angle to the minimum lead angle in a sine wave type of change over a 24 hour period. There will also be a total eclipse of the Relay System once every 24 hours for a short interval of approximately one hour per day. During this period, the shutters on the Spacecraft lens sub-element will be activated and no energy transmitted during that period. A nominal safety factor in time of shutter activation could also be applied.

There is a time lag between light arrival from a Coronal Mass Ejection (CME) event and the arrival of electrons from the ejection. In the case of the Spacecraft, this is approximately 0.5 seconds. Also, CMEs can last multiple hours. The object of the response would be to minimize the impact on system operation of a CME occurring in the direction of the Spacecraft. Without reaction, the CME could divert the Spacecraft off of intended orbit and possibly tilt the lens sub-element. Multiple reactions with respect to the solar sail are possible: reduce the sail presented area; release of rigidity (e.g., locking mechanism) of frame holding the sail. With respect to the possible tilt of the lens sub-element, the fast reaction shutters could be activated.

Changes in gravitational pull can occur due to passage of comets, changes in solar emissions over the solar cycle, etc. Changes in gravitational pull would occur slowly over time and would have the effect of drawing the Spacecraft off of its intended orbit. These changes in orbit would be detectable by both the PSS current position vs. the intended PSS position and also the inertial navigation system (INS). Required changes to the presented area of the solar sail would be calculated and effected.

A potential safety concern is that some unforeseen event could draw the energy beam off of the Relay Element and, consequently, the energy beam could impact the earth's surface and cause damage to, say, an urban area. A key safety measure will be a fast-activated shutter system affixed to both the Spacecraft lens-sub-element and the Relay lens sub-element. The shutters themselves could be attached to the lens frame and positions controlled by actuators directed by control sub-elements of the respective elements. The shutters would be highly reflective for heat control purposes. The shutters could be activated based on imminent events such as CME at the Spacecraft or potential impact by some object in space. In the deploying of the satellite's payload of the focusing device, the focusing device nominally consists of an optical lens with a shutter in the closed position. Once correctly aligned to the target and the ground-based or space based target is ready to receive the high solar flux, the shutter can be opened.

Prior to system implementation, a series of cost benefit trade studies would be undertaken to: minimize implementation costs; or, alternatively, maximize the power generated; or, alternatively, minimize the schedule under which the system could be implemented. Some key factors for these trade studies as discussed below.

The 1,500,000 km orbit from the sun was selected as an orbit outside of the range of typical solar flares (i.e., less than 400,000 km for typical flares) with a safety factor and close enough to the sun to receive very high $W/m^2$. Clearly, other orbits could be selected. As an example, one might choose one half the distance from the earth to the sun. This orbit would relax the tight system tolerances (e.g., precise angular pointing requirements) and provide a four-fold increase on energy that could be transmitted to earth. Such a system with this type of orbit could be connected with some existing solar power facilities which could be modified to accommodate this increase in received energy. In the application of focusing high flux solar energy onto earth, the preferred type of solar orbit would have an orbital period match the earth's orbital period of one year. The velocity of the new orbit would be equal to the distance traveled as estimated by the orbital distance divided by the orbital period or $2\times\pi\times r$, where r is the orbital radius divided by 365 days. Thus, if the new desired orbit is 1,500,000 km, then the orbital velocity would equal $$\frac{2\times\pi\times 1.5\times 10^9 \text{ m}}{365.25 \text{ days}\times 24\frac{\text{hr}}{\text{day}}\times 3600\frac{\text{sec}}{\text{hr}}} \text{ or } \sim 0.3 \text{ km/s}.$$

This slow orbit is only achievable due to the solar sails, which counteract gravity. The desired orbital period would be one year, such that it is always on the near side of the sun from the earth's perspective.

The number and placement of Relay Systems would be a key overall system consideration. One or more Relay Systems could be in geo-synchronous orbit with earth. For example, one system could be positioned above the US southwest and another above the Gobi Desert in China. Alternatively, the energy beam could be redirected between two or more Relay Systems to multiple Ground Receive Elements depending on time of peak demand for the region covered by each specific Ground Receive Element. Such a configuration could provide worldwide electrical power from a single Spacecraft System and potentially be a cost saving measure.

To visualize 'above earth's orbit', imagine a line from the center of the sun to the center of the earth. Then a second line which is perpendicular to the sun/earth line. This line would extend through the poles only twice a year—spring and fall equinoxes, as a result of the tilted axis of the spin of the earth as it circles the sun. This orbit would have the potential advantage of eliminating the requirement placed on the Spacecraft System that it must track (i.e., the Relay System(s) or Ground Receive Elements on earth) and adjust beam direction near continuously to account for these system(s)/elements motion. Multiple Ground Receive Elements could be services by a single 'above earth's orbit' Relay System depending on time of peak demand for the region covered by each specific Ground Receive Element. Similarly, a Relay System could be positioned 'below earth's orbit' and Ground Receive Elements positioned to service the southern hemisphere.

There is a myriad of lens designs. One type of large lens which reduces weight is the Fresnel type of lens. Another alternative would be a very large number of small lens aligned such that they produced near parallel light. Further, the lens sub-element could be stationary or rotating, as described above.

Multiple methods for alignment are available. One type is intelligent actuators attached to a rigid framework holding the lens sub-element. Another method would be to have elements that provide thrust at key positions on the framework.

A laser marker could be aligned with the lens sub-elements and used in conjunction with the laser receivers in the Ground Receive Element.

Multiple designs are possible for a Ground Receive element. One design type would be to focus the energy from the Relay System on to a horizontal receive sub-element, sized in diameter (with safety factor) to receive very high energy per unit area. Note that the angular divergence of the energy beam emanating from the Relay System is a design factor and area form a 30 meter radius lens sub-element in the Relay System could diverge to, say, a 120 meter radius spot on the ground. Alternatively, a system of parabolic reflectors could be used to focus the energy onto a vertical receive sub-element.

Referring now to FIG. 1, starting at the center of the figure is the sun. In an orbit around the sun is the Spacecraft System 12. The Spacecraft System orbit period is one year, exactly equal to the earth's orbit period. The Spacecraft System location on its orbit is perfectly aligned such that it is directly between the earth and the sun. Some of the example calculations used in this patent envision an orbit for the Spacecraft System about 1,500,000 km from the sun. The orbit could be different and calculations would change accordingly. The orbits depicted in the figure are not to scale. Depicted on the Spacecraft System are two squares, which represent solar sails. These sails exert a force on the Spacecraft System which is opposite from the gravitational pull from the sun on the Spacecraft System. This enables a 'slow' orbit, which is synchronous with the earth's orbit. In the center between the two squares is a circle, which represents a lens. The purpose of the lens is to focus the sun's diverging energy stream 14 into a beam of near parallel energy 16, which is focused onto the earth's surface. This beam 16 will deliver several orders of greater energy than currently delivered by the sun. The energy level is dependent on, among other factors, the following: orbital distance of the Spacecraft System from the sun; lens size and lens efficiency. The long arrow 18 from the earth to the Spacecraft system represents the alignment check. If the spacecraft is tilted off its axis, it will no longer receive the laser pulses on the detector and the shutter will close.

FIG. 2 is a variation on FIG. 1. Under this system configuration, additional spacecraft have been added—the Relay System. In this example, the Relay System is in geo-synchronous orbit around the earth. With this system configuration the energy beam emanating from the lens on the Spacecraft System is focused on the Relay System in lieu of focusing directly onto the earth's surface. The Relay System could have a lens or reflector to re-direct the energy beam from the Spacecraft System to a specific spot on the earth's surface. This would entail small angular changes in the pointing angle of the lens on the Spacecraft System to account for the orbital position of the Relay System. Two Relay Systems 20 and 22 are shown. One Relay System could provide an energy stream nearly 24 hours a day with the only interruption being a short eclipse period each day when the earth passed between the Relay System and the sun. If two Relay Systems were used, a single Spacecraft System could provide energy to power North America during its daylight and Asia during its daylight period. Or, as illustrated in this figure, a continuous energy stream without interruption.

FIG. 3 illustrates the relative size of a solar sail 30 in relation to the size of a lens 32. The solar sail in this example is $1.3*10^5$ m$^2$. As indicated in FIGS. 1 & 2, two sails would be part of the Spacecraft System. This number is not fixed, rather the size and configuration would be a result of trade studies in which the following, among other considerations, would be considered: orbital distance from the sun; number of sails on spacecraft; material used for sail, control mechanisms, frame shapes; etc. For example, an orbit near the sun (e.g., 1,500,000 km) would necessitate a frame made of a high temperature resistance material such as tungsten could be the frame of the solar sail. In a similar manner, the lens design would be the product of trade studies that considered lens types, materials, orbital distances from the sun.

Figure 4:
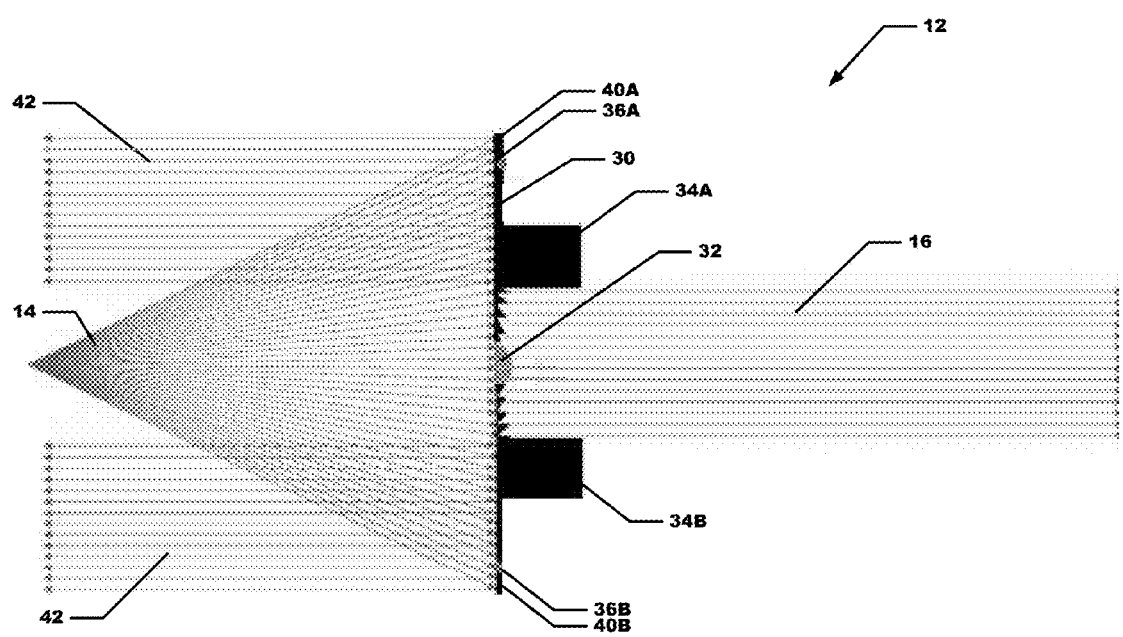
FIG. 4 is a schematic diagram of the solar lens satellite with flaps closed.

FIG. 4 illustrates one of possible Spacecraft System configurations. Point source 14 is one of near infinite sources of energy on the sun's exterior surface which emits energy across the EM spectrum and solar wind. The lens sub-element 32 is shown in this illustration as a Fresnel type lens. However, multiple other lens types would be considered for the final design.

The control sub-elements 34A and 34B each have multiple functions to include, but not limited to: communication with and response to commands issued by the system Control Element on earth; interface with the Planetary Surveillance System (PSS); activation of safety shutter system, as required; control of attitude heading of the lens sub-element with respect to orbital path; and control of the solar sails presented area with respect to the direction of the solar wind.

Frame 30 holds the solar sails and the solar sails themselves, which is connected to the control sub-sub-element of the Spacecraft System. Mechanisms 36A and 36B control orientation of solar sail extension to provide fine controls.

The extensions 40A and 40B to the solar sail frame as illustrated in this figure result in the maximum push on the Spacecraft System by solar wind. This configuration is denoted as 'flaps closed'.

FIG. 5 is a replication of FIG. 4 with change of 'flaps open' vs. 'flaps closed'. In this 'flaps open' illustration, the surface area from the solar sail is reduced. This configuration might be selected in anticipation of arrival of a coronal mass ejection (CME) oriented toward the Spacecraft System. The added mass of a CME could cause the Spacecraft System to veer of the intended orbit. The reduction in presented area of the solar sail could reduce any effects of a CME.

FIG. 6 is a replication of FIG. 4 with a different orientation of the flaps—'flaps angled'. This orientation might be selected alter the position, velocity, acceleration, roll, pitch and yaw of the Spacecraft System orbit.

Items 42 and 44 represent the photons that are reflected off of the solar sail by the angled flaps. 46A and 46B represent the direction of force exerted on the Spacecraft System in accordance with the law of conservation of momentum.

FIG. 7 illustrates one of many possible configurations for the lens sub-element 32. It may be desirable to assemble the Spacecraft System and, in particular, the lens sub-element in space from pieces 32A-32G. This illustration shows a 30 meter square lens, with a maximum dimension of the lens parts of approximately 21 meters.

FIG. 8 illustrates an orbit for the Spacecraft System, which is about ½ the distance from the earth to the sun. At this distance the energy density received from the sun would be four times that received at earth. Such an orbit might be practical for initial deployment of the system. The four times energy density could be focused at a redesigned solar power facility and would increase its power output four fold. Also of interest in this figure is the relative velocity 54 of the Spacecraft System 12 along its orbit. Note that velocity is ½ the earth's velocity 52 along its orbit.

FIG. 9 depicts one of the challenges in implementing the proposed system, namely achieving the desired orbit for the Spacecraft System. This figure shows the Spacecraft System 12 in a path 56 opposite to that of earth 52. The gravitational pull from the sun will achieve after a short period the gravitational pull from earth due to the counter orbital rotation. With the suns gravitational pull the Spacecraft System will be accelerated and slowly spiral toward the sun. This acceleration can be controlled through controlling the presented area of the solar sails on the Spacecraft System.

Figure 10:
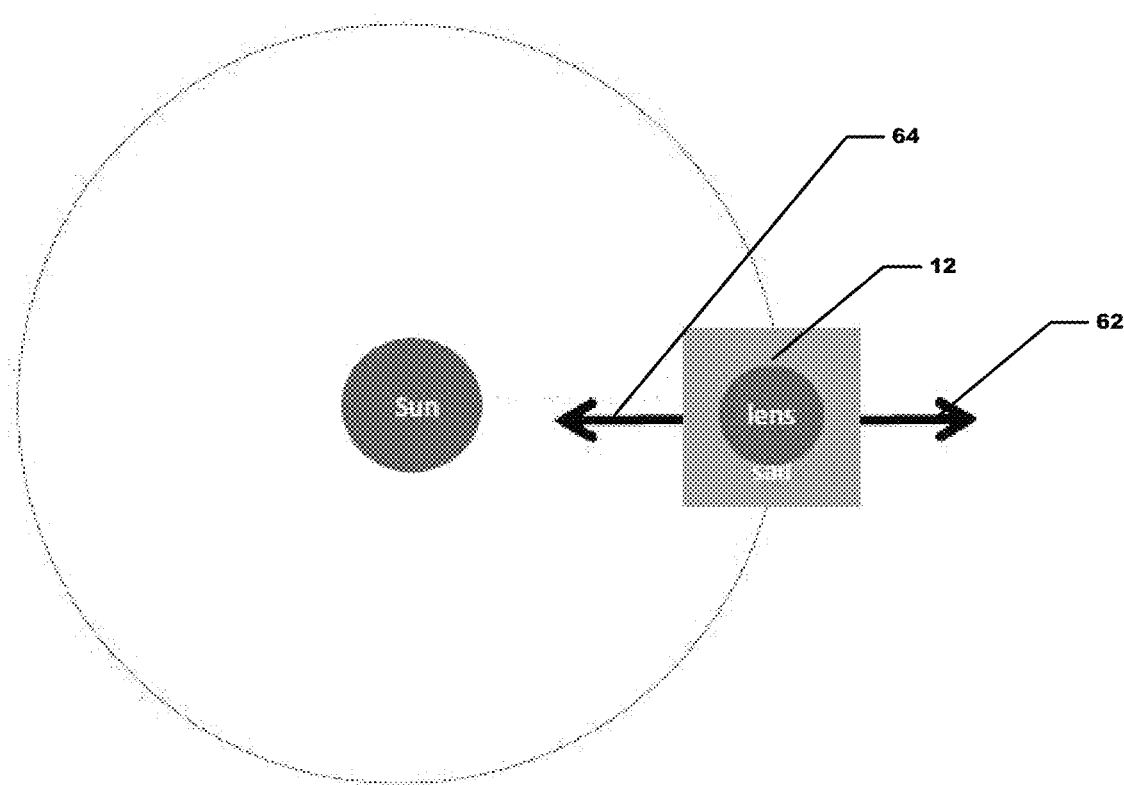
FIG. 10 is a diagram showing the net force on the solar lens satellite.

FIG. 10 illustrates the solar lens satellite in equilibrium. Three key forces apply. First, centrifugal force which tends to cause the Spacecraft System 12 to fly off into space along its current velocity vector. Second is the sun's gravitational force 64. At a low solar orbit with a slow velocity as described in this patent, this force is greater than the centrifugal force and without some other force on the Spacecraft System, it would spiral into the sun. This other force 62 is due the solar wind pushing the Spacecraft System away from the sun. Thus with proper presented area solar sails, equilibrium and a 'slow' orbit to be geo-synchronous with earth are achieved.

Figure 11:
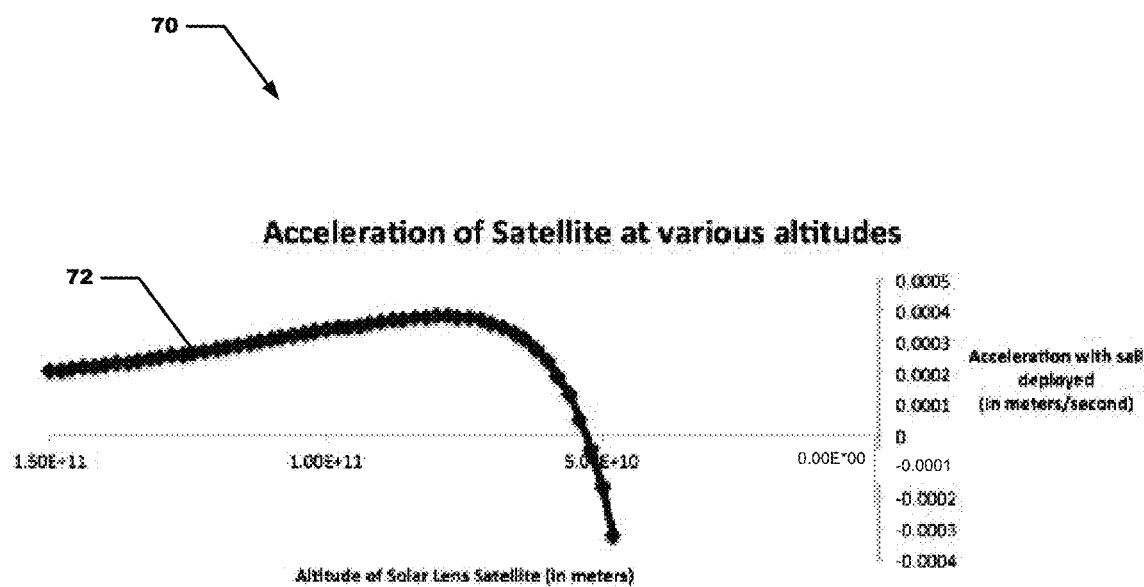
FIG. 11 is a plot of the acceleration of the satellite at various altitudes.

FIG. 11 illustrates a plot 70 of the Satellite's acceleration 72 as it relates to altitude for a given sail size. Note that there is a point, which crosses zero. At this position the force of gravity from the sun on the satellite will be equal and opposite to the force of the solar flux on the solar sail.

Figure 12:
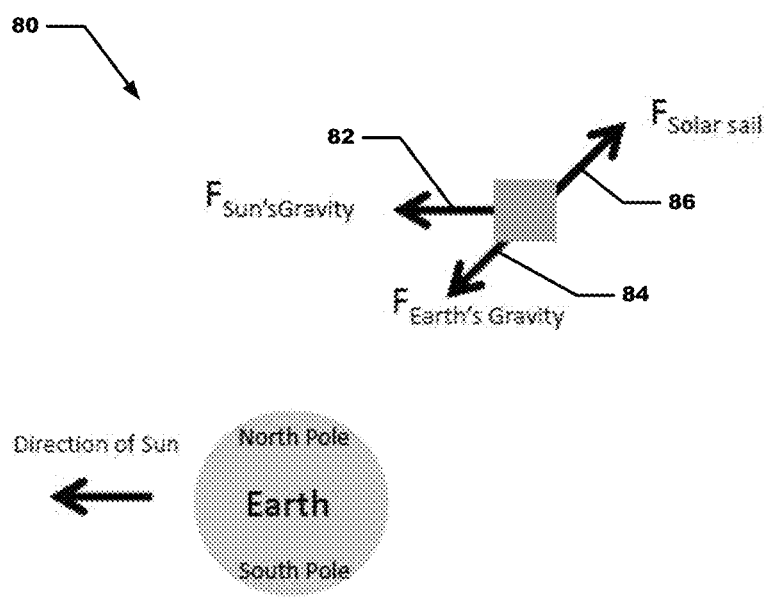
FIG. 12 is a net forces diagram of a satellite near the North Pole.

FIG. 12 illustrates the final relay satellite positioned above the earth; in equilibrium; and synchronous with the earth's orbit around the sun. Three key forces apply. First, the gravitational force 82 of the sun exerts a force in the direction toward the sun. Second, the gravitational force 84 of the earth exerts a force toward the center of the earth. Third, by means of controlling the direction of the solar sail panels, the solar sail exerts a force 86 away from the sun and in the direction of Polaris. In order for these forces to balance these forces in a radial fashion with the sun in the center, $F_{Sun'sGravity} + F_{Earth'sGravity} \cos \phi = F_{SolarSail} \cos \theta$. In order for these forces to balance in the direction of Polaris, $F_{SolarSail} \sin \Theta = F_{Earth'sGravity} \sin \phi$. The benefit of such a position of the final relay satellite would be the fact that from the perspective of the sun, the final satellite would be in a fixed position.

Figure 13A:
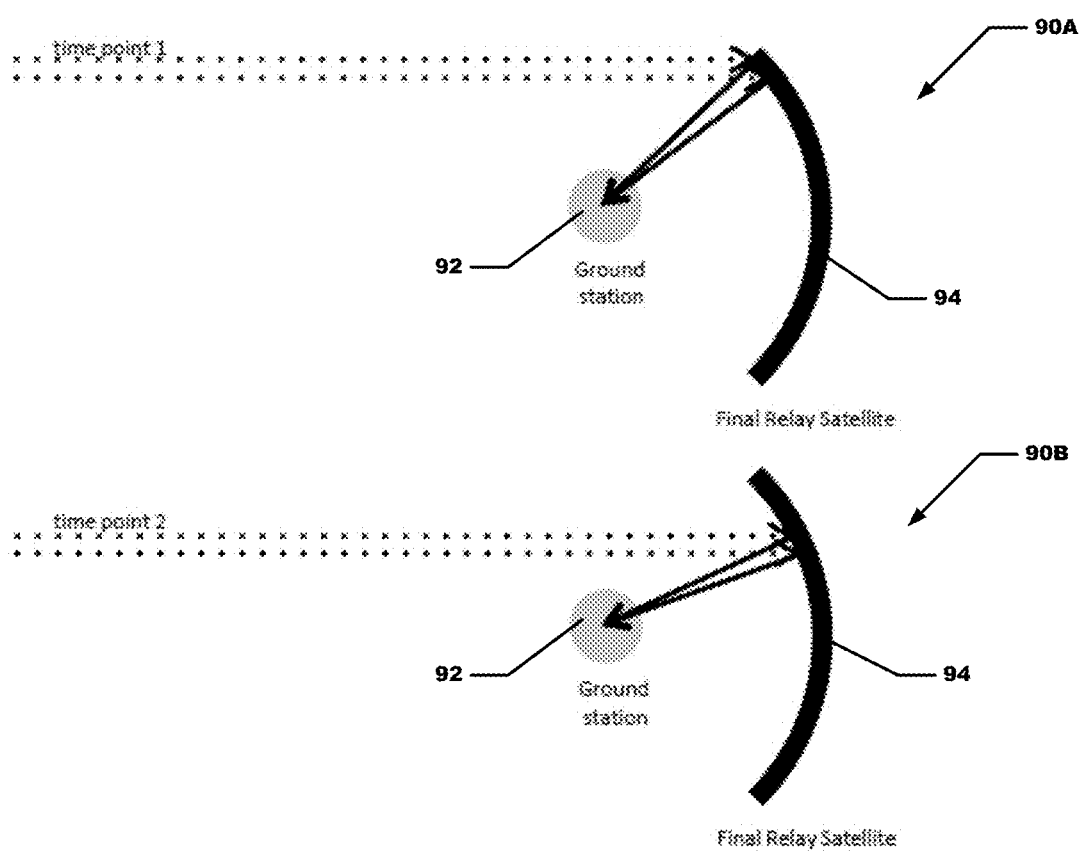
FIG. 13A is a first diagram showing the final relay focusing mirror at various time points.
Figure 13B:
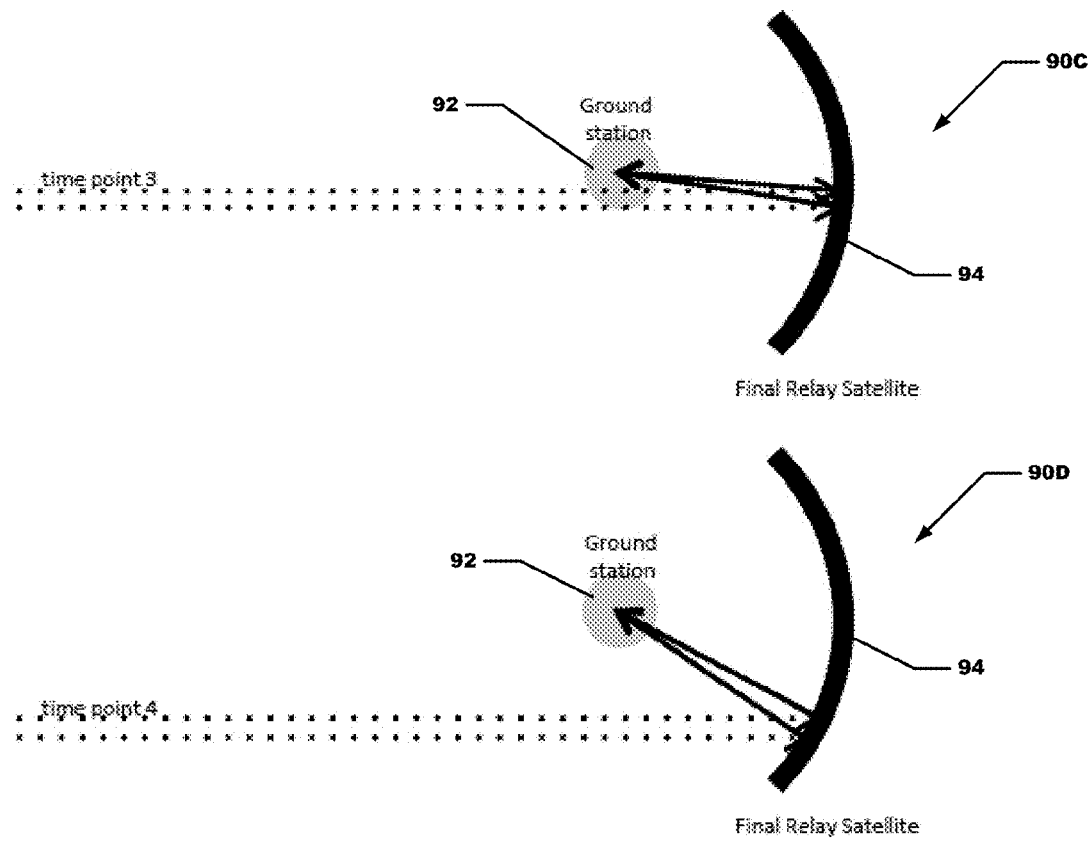
FIG. 13B is a second diagram showing the final relay focusing mirror at various time points.

FIG. 13A-B illustrate the final Relay Satellite with a view from the perspective of Polaris. The curve is a cross-section from a curved mirror. This illustrates near-parallel light hitting the refocusing mirror 94, which then travels down to the ground station 92 on the North Pole. Four time points are shown to illustrate that the parallel beam may strike the final relay station at different spots, but the direction of the beam will remain focused on the ground station.

Figure 14A:
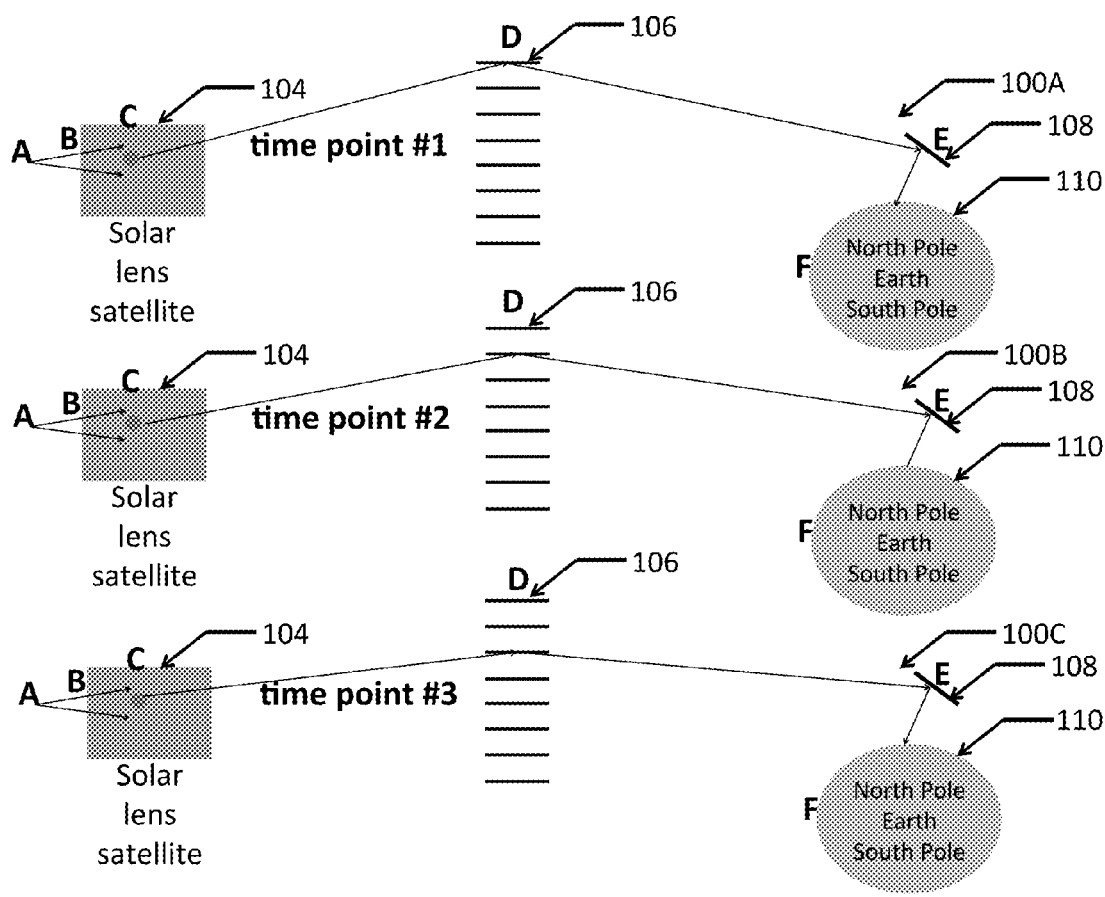
FIG. 14A is a first diagram showing a relay focusing mirror array at various time points.
Figure 14B:
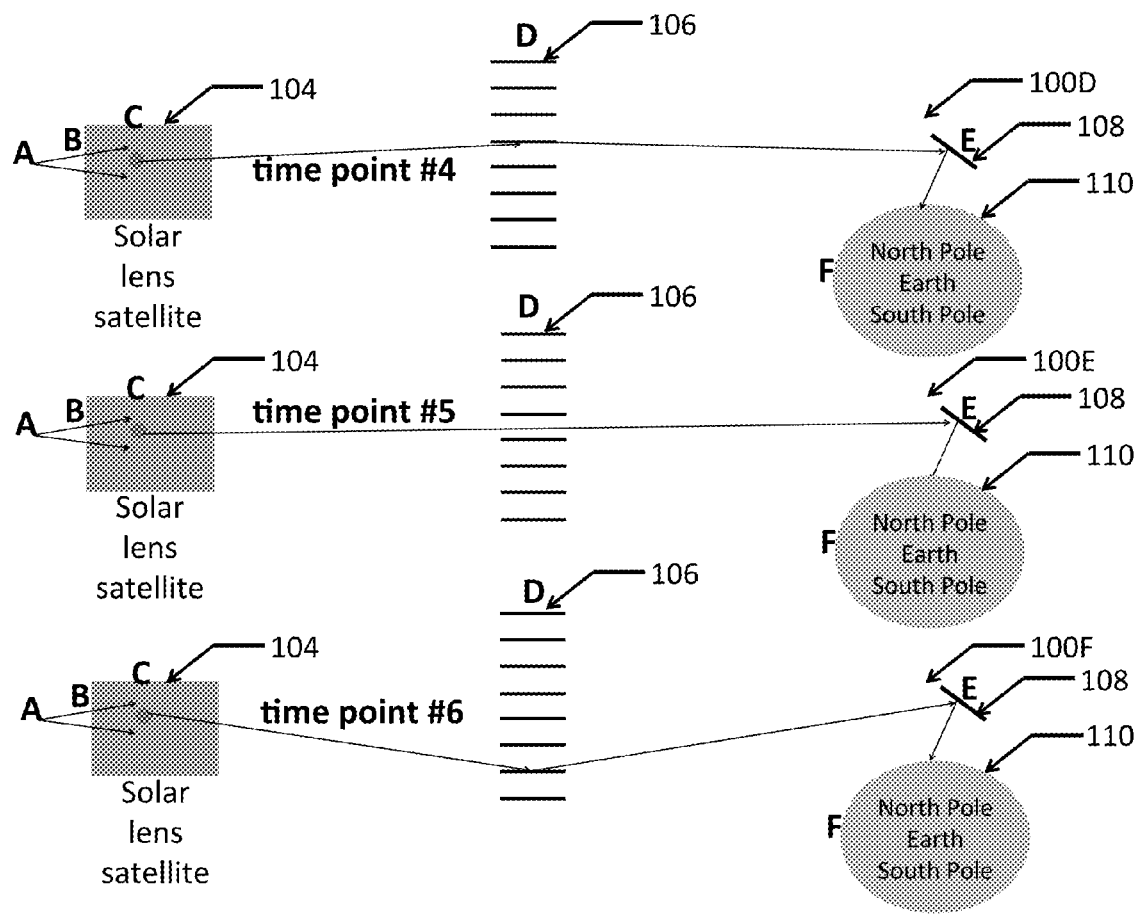
FIG. 14B is a second diagram showing a relay focusing mirror array at various time points.

FIGS. 14A-B illustrate the Relay satellite. 102 represents the diverging light from the sun. 104 represents the solar lens satellite sending out near-parallel light as indicated by the single arrow. 106 represents the Relay satellite with the design configuration of multiple parallel reflectors. 108 represents the final Relay satellite with sending in the high density flux toward the North Pole Station. 110 represents the earth with the North Pole and South Pole labeled.

There are 6 time points shown, which illustrates that subtle inaccuracies in the pointing direction could be corrected for by the reflectors at the Relay Satellite.

Figure 15:
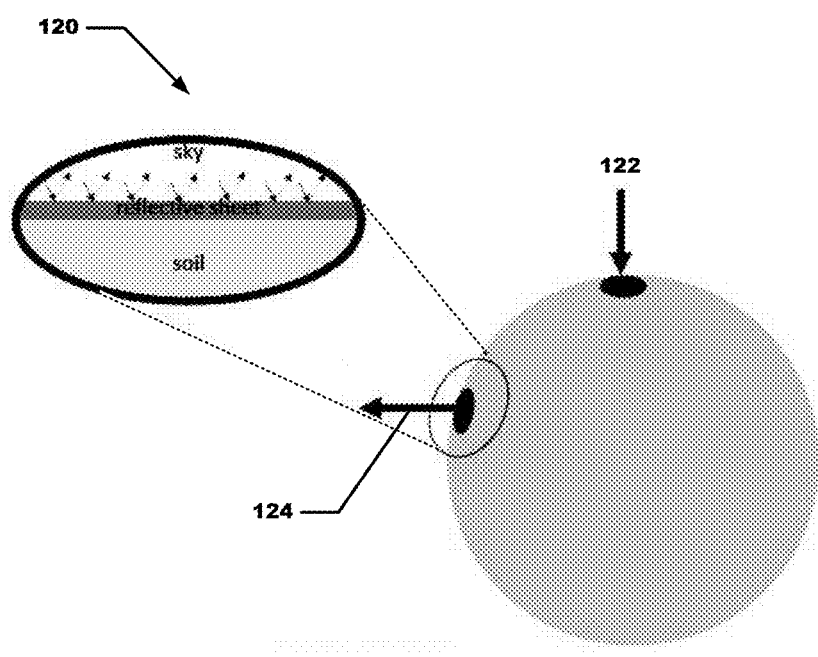
FIG. 15 is a diagram showing a balance of energy.

FIG. 15. This figure illustrates a neutral amount of energy deposited on the earth. Despite the increase in the solar flux illustrated at the North Pole, there is a decrease in the amount of absorbed solar energy in the desert of the Southwestern United States by means of a man-made aluminum reflecting surface.

Figure 16A:
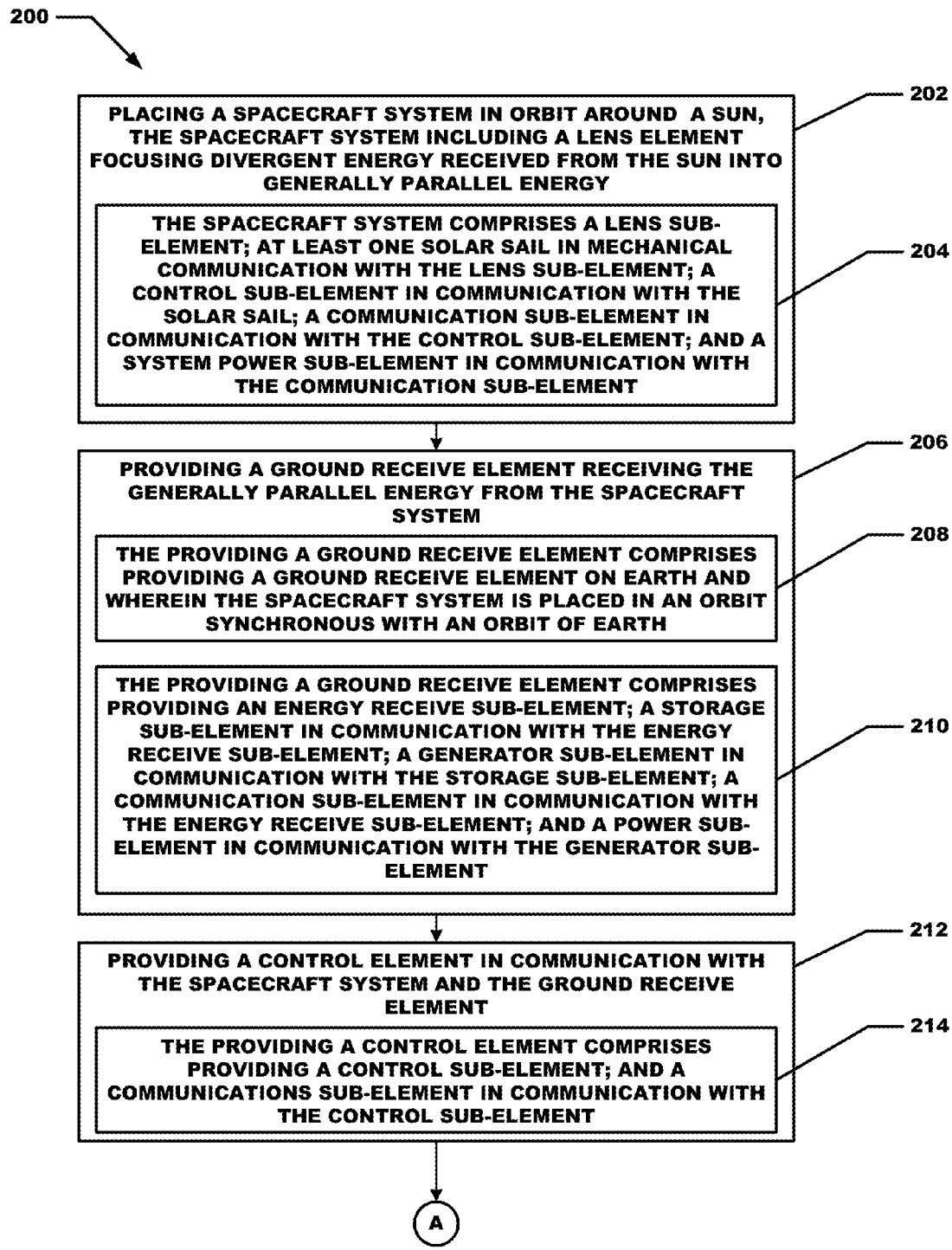
FIGS. 16A and 16B are a flow diagram of a particular method in accordance with embodiment of the invention.
Figure 16B:
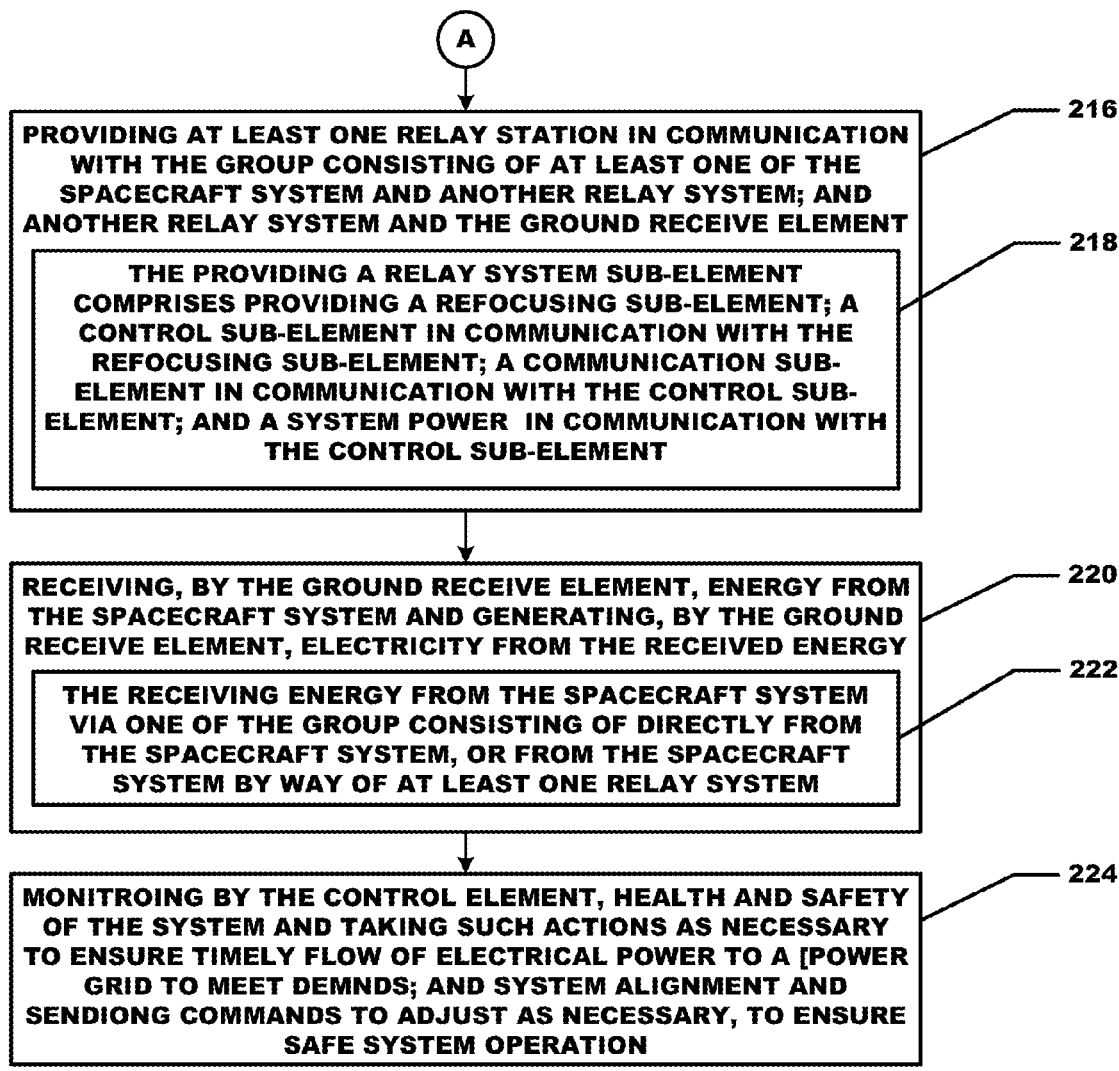

A flow chart of the presently disclosed method is depicted in FIG. 16A and FIG. 16B. The rectangular elements are herein denoted "processing blocks". The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

In a particular embodiment of a method for a method of using a solar focusing device, the method begins with processing block 202 which discloses placing a spacecraft system in orbit around a sun, the spacecraft system including a lens element focusing divergent energy received from the sun into generally parallel energy. As further disclosed in processing block 204, the spacecraft system includes a lens sub-element; at least one solar sail in mechanical communication with the lens sub-element; a control sub-element in communication with the solar sail; a communication sub-element in communication with the control sub-element; and a system power sub-element in communication with the communication sub-element.

Processing block 206 states providing a ground receive element receiving the generally parallel energy from the spacecraft system. As a further stated in processing block 208 providing a ground receive element comprises providing a ground receive element on earth and wherein the spacecraft system is placed in an orbit synchronous with an orbit of earth. Processing block 210 recites the providing a ground receive element comprises providing an energy receive sub-element; a storage sub-element in communication with the energy receive sub-element; a generator sub-element in communication with the storage sub-element; a communication sub-element in communication with the energy receive sub-element; and a power sub-element in communication with the generator sub-element.

Processing block 212 discloses providing a control element in communication with the spacecraft system and the ground receive element. As shown in processing block 214, the providing a control element comprises providing a control sub-element; and a communications sub-element in communication with the control sub-element.

Processing continues with processing block 216 which recites providing at least one relay station in communication with the group consisting of at least one of the spacecraft system and another relay system; and another relay system and the ground receive element. Processing block 218 discloses wherein the providing a relay system sub-elements comprises providing a refocusing sub-element; a control sub-element in communication with the refocusing sub-element; a communication sub-element in communication with the control sub-element; and a system power in communication with the control sub-element.

Processing block 220 states receiving, by the ground receive element, energy from the spacecraft system and generating, by the ground receive element, electricity from the received energy. Processing block 222 recites receiving energy from the spacecraft system via one of the group consisting of directly from the spacecraft system, or from the spacecraft system by way of at least one relay system.

Processing block 224 discloses monitoring, by the control element, health and safety of the system and take such actions as necessary to ensure timely flow of electrical power to the power grid to meet demands; and system alignment and sending commands to adjust, as necessary, to ensure safe system operation.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. An apparatus comprising:
   a spacecraft system in heliocentric orbit around a sun, said spacecraft system comprising a lens element that focuses divergent energy received from said sun into generally parallel energy;
   a ground receive element that receives said generally parallel energy from said spacecraft system; and
   a control element, in communication with said spacecraft system and said ground receive element, that coordinates the ground receive element with the spacecraft system.

2. The apparatus of claim 1 further comprising at least one relay station in communication with at least one member of the group consisting of:
   at least one of said spacecraft system and another relay system; and
   another relay system and said ground receive element.

3. The apparatus of claim 1 wherein said spacecraft system comprises:
   at least one solar sail.

4. The apparatus of claim 1 wherein said ground receive element is located on earth and wherein said heliocentric orbit of the spacecraft system is synchronous with an orbit of earth.

5. The apparatus of claim 1 wherein said ground receive element
receives and stores at least some of the parallel energy received from the spacecraft system.

6. The apparatus of claim 5 wherein said ground receive element generates electricity from the received energy.

7. The apparatus of claim 6 wherein said ground receive element receives the energy either directly from said spacecraft system, or indirectly from said spacecraft system by way of at least one relay system.

8. The apparatus of claim 1 wherein said control element comprises:
 a control sub-element; and
 a communications sub-element in communication with said control sub-element.

9. The apparatus of claim 8 wherein said control element monitors health and safety of the system and take such actions as necessary to ensure timely flow of electrical power to a Power Grid to meet demands; monitor system alignment and send commands to adjust, as necessary; and ensure safe system operation.

10. The apparatus of claim 2 wherein said relay system refocuses the energy from said spacecraft system.

11. The apparatus of claim 3 wherein said spacecraft system further comprises at least one flap disposed on said solar sail, said at least one flap movable between a first position and a second position.

12. A method comprising:
 placing a spacecraft system in heliocentric orbit around a sun, said spacecraft system comprising a lens element focusing divergent energy received from said sun into generally parallel energy;
 ground receive element receiving said generally parallel energy from said spacecraft system; and
 a control element communicating with said spacecraft system and said ground receive element and coordinating the ground receive element with the spacecraft system.

13. The method of claim 12 further comprising redirecting the parallel energy with at least one relay station.

14. The method of claim 12 further comprising controlling motion of the spacecraft system
 with at least one solar sail.

15. The method of claim 12 comprising maintaining said spacecraft system in an heliocentric orbit synchronous with an orbit of earth.

16. The method of claim 12 comprising the ground receive element receiving and storing at least some of the parallel energy from the spacecraft system.

17. The method of claim 16 comprising generating, by said ground receive element, electricity from the received energy.

18. The method of claim 17 comprising receiving the parallel energy from said spacecraft system either directly from said spacecraft system, or indirectly from said spacecraft system by way of at least one relay system.

19. The method of claim 12 comprising the control element monitoring the spacecraft system with:
 a control sub-element; and
 a communications sub-element in communication with said control sub-element.

20. The method of claim 19 further comprising monitoring, by said control element, health and safety of the spacecraft system and taking actions to ensure timely flow of electrical power to a power grid to meet demands; and system alignment and sending commands to adjust, as necessary, to ensure safe system operation.

21. The method of claim 13 comprising at least one relay station refocusing the energy from said spacecraft system.

22. The method of claim 14 wherein said providing a spacecraft system further comprises providing at least one flap disposed on said solar sail, said at least one flap movable between a first position and a second position.

* * * * *